US012764536B2

(12) United States Patent
Wang et al.

(10) Patent No.: US 12,764,536 B2
(45) Date of Patent: Oct. 13, 2026

(54) WIRELESS COMMUNICATION METHOD AND APPARATUS, ELECTRONIC DEVICE, AND STORAGE MEDIUM

(71) Applicant: Beijing X-Ring Technology Co., Ltd., Beijing (CN)

(72) Inventors: Ping Wang, Beijing (CN); Baichen Xu, Beijing (CN); Yunfeng Xu, Beijing (CN); Xiaofei Gong, Beijing (CN)

(73) Assignee: Beijing X-Ring Technology Co., Ltd., Beijing (CN)

(*) Notice: Subject to any disclaimer, the term of this patent is extended or adjusted under 35 U.S.C. 154(b) by 11 days.

(21) Appl. No.: 18/887,401

(22) Filed: Sep. 17, 2024

(65) Prior Publication Data

US 2025/0338125 A1 Oct. 30, 2025

(30) Foreign Application Priority Data

Apr. 28, 2024 (CN) ......................... 202410526600.5

(51) Int. Cl.

*H04W 12/106* (2021.01)
*H04W 4/80* (2018.01)
*H04W 12/06* (2021.01)
*H04W 76/10* (2018.01)

(52) U.S. Cl.

CPC ........... *H04W 12/106* (2021.01); *H04W 4/80* (2018.02); *H04W 12/06* (2013.01); *H04W 76/10* (2018.02)

(58) Field of Classification Search

CPC ..... H04W 12/106; H04W 12/06; H04W 4/80; H04W 76/10; H04W 76/14

See application file for complete search history.

(56) References Cited

U.S. PATENT DOCUMENTS

2007/0192600 A1* 8/2007 Wong ...................... H04L 63/08 713/168
2015/0319559 A1* 11/2015 Lee ...................... H04W 40/24 455/41.2
2018/0183772 A1* 6/2018 Jeon .................... H04L 63/0428
2019/0150093 A1* 5/2019 Kweon ................ H04W 76/30 370/311
2020/0396579 A1 12/2020 Kallam
2025/0081262 A1* 3/2025 Luo ...................... H04W 88/06

FOREIGN PATENT DOCUMENTS

EP 1736010 B1 9/2013

OTHER PUBLICATIONS

European Patent Application No. 24196914.6, Search and Opinion dated Feb. 3, 2025, 8 pages.

* cited by examiner

*Primary Examiner* — Thaddeus J Plecha
(74) *Attorney, Agent, or Firm* — Cozen O'Connor

(57) ABSTRACT

A wireless communication method and apparatus, an electronic device and a storage medium, belongs to the field of wireless communication technology. The method includes establishing a Bluetooth connection between a first device and a second device; sending a first data packet to the second device and receiving a second data packet sent by the second device based on a Bluetooth connection between the first device and the second device; establishing a wireless connection between the first device and the second device, in which the establishing of the wireless connection does not include an interaction process of handshake messages; and performing the wireless communication between the first device and the second device based on the first data packet and the second data packet.

18 Claims, 12 Drawing Sheets

WIRELESS COMMUNICATION METHOD AND APPARATUS, ELECTRONIC DEVICE, AND STORAGE MEDIUM

CROSS REFERENCE TO RELATED APPLICATIONS

This application claims priority and benefits to Chinese Application No. 202410526600.5, filed on Apr. 28, 2024, the entire content of which is incorporated herein by reference.

TECHNICAL FIELD

The disclosure relates to the field of wireless communication technology, in particular to a wireless communication method and apparatus, an electronic device and a storage medium.

BACKGROUND

At present, wireless communication has advantages of high flexibility, high convenience, and ease to build a wireless network, and is widely applied in document transmission, screen casting, Internet of Things, intelligent transportation and other fields. However, in the related art, when a wireless connection is established between two devices, since it is required to interact messages for multiple times, and the message interaction takes a long time, the establishing of the wireless connection is time consuming and has a low efficiency.

SUMMARY

According to a first aspect of embodiments of the disclosure, a wireless communication method is provided. The method includes: establishing a Bluetooth connection between a first device and a second device; sending a first data packet to the second device and receiving a second data packet sent by the second device based on a Bluetooth connection between the first device and the second device, in which both the first data packet and the second data packet are used for a wireless communication between the first device and the second device; establishing a wireless connection between the first device and the second device, in which the establishing of the wireless connection does not include an interaction process of handshake messages; and performing the wireless communication between the first device and the second device based on the first data packet and the second data packet.

According to a second aspect of embodiments of the disclosure, another wireless communication method is provided. The method includes: establishing a Bluetooth connection between a first device and a second device; receiving a first data packet sent by the first device and sending a second data packet to the first device based on a Bluetooth connection between the first device and the second device, in which both the first data packet and the second data packet are used for a wireless communication between the first device and the second device; establishing a wireless connection between the first device and the second device, in which the establishing of the wireless connection does not comprise an interaction process of handshake messages; and performing the wireless communication between the first device and the second device based on the first data packet and the second data packet.

According to a third aspect of embodiments of the disclosure, an electronic device is provided. The electronic device includes a processor and a memory for storing instructions executable by the processor. The processor is configured to perform steps of the method according to the first aspect or the second aspect of the embodiments of the present disclosure.

It should be understood that the above general description and the following detailed descriptions are exemplary and explanatory only and do not limit the embodiments of the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the embodiments of the disclosure, and do not constitute undue limitation of the present disclosure.

DETAILED DESCRIPTION

In order to enable ordinary personnel in the art to better understand the technical solution disclosed in the disclosure, a clear and complete description of the technical solution in the embodiments disclosed in the disclosure will be provided below in conjunction with the accompanying drawings.

It should be noted that the terms "first", "second", etc. used in the specification and claims of the disclosure, as well as in the accompanying drawings, are intended to distinguish similar objects and do not necessarily describe a specific order or sequence. It should be understood that the data used in this way can be interchanged in appropriate circumstances, so that the embodiments described herein can be implemented in order other than those illustrated or described herein. The embodiments described in the following embodiments do not represent all embodiments consistent with the present disclosure. On the contrary, they are only examples of devices and methods consistent with some aspects of the present disclosure as described in the accompanying claims.

The acquisition, storage, use, and processing of data in the technical solution of the present disclosure comply with relevant laws and regulations.

Figure 1:
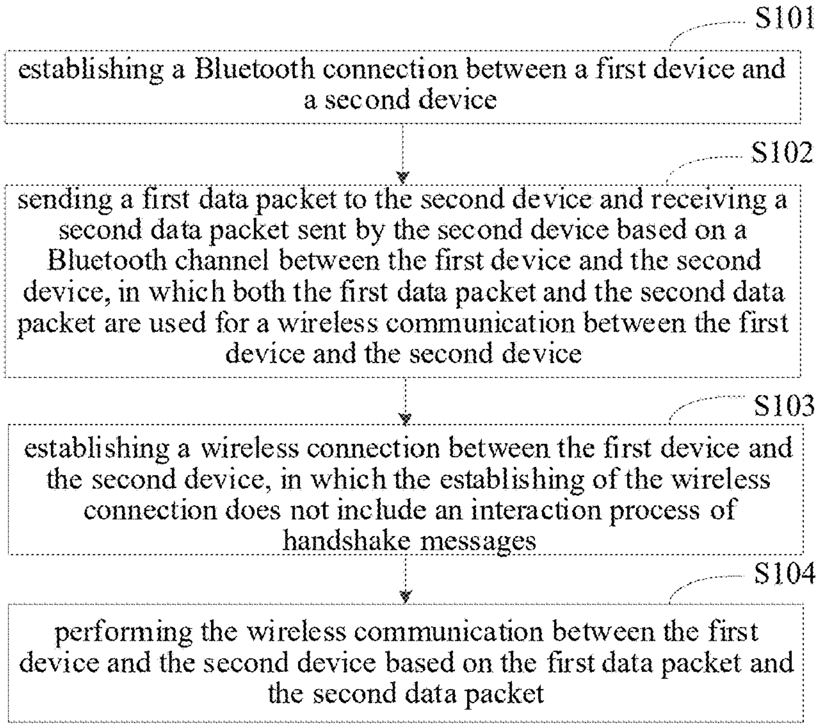
FIG. 1 illustrates a flowchart of a wireless communication method according to an embodiment.

FIG. 1 is a flowchart of a wireless communication method according to an embodiment. As shown in FIG. 1, the wireless communication method according to the embodiment of the present disclosure includes the following steps.

At step S101, a Bluetooth connection between a first device and a second device is established.

It should be noted that an execution subject of the wireless communication method disclosed in the embodiment may be an electronic device, such as including a mobile phone, a laptop, a desktop computer, a vehicle-mounted terminal, a smart home appliance, a wearable device, etc. The wearable device can include a wrist worn device (such as a smart watch, a smart bracelet), a head worn device, a foot worn device, etc. The wireless communication method of the embodiment can be executed by a wireless communication apparatus of an embodiment, and the wireless communication apparatus of the embodiment can be configured in any electronic device to execute the wireless communication method of the embodiment.

In an implementation, the execution subject may include the first device. The first device and the second device may be different electronic devices.

It should be noted that the Bluetooth connection between the first device and the second device may be established by any Bluetooth connection method in the related art, which is not limited herein.

In an implementation, establishing the Bluetooth connection between the first device and the second device includes: broadcasting a fifth data packet to the second device, receiving second indication information sent by the second device, and establishing the Bluetooth connection between the first device and the second device. The fifth data packet carries an identification of the first device, and the second indication information is used for instructing the first device to establish the Bluetooth connection with the second device.

In an implementation, establishing the Bluetooth connection between the first device and the second device includes: receiving a sixth data packet broadcasted by multiple candidate devices, determining the second device from the multiple candidate devices, and establishing the Bluetooth connection between the first device and the second device. The sixth data packet carries identifications of the multiple candidate devices. For example, a candidate device list can be displayed on a page of the first device, and the second device can be determined from the multiple candidate devices based on a selection operation on the second device in the candidate device list from a user.

In some examples, the fifth data packet carries a capability (CAP) identification indicating whether the first device supports a fast wireless connection, the sixth data packet carries a CAP identification indicating whether the candidate device supports a fast wireless connection. For example, if both the first device and the second device support the fast wireless connection, step S102 and subsequent steps can be executed. On the contrast, if the first device and/or the second device does not support the fast wireless connection, an original wireless communication process can be executed.

In an implementation, establishing the Bluetooth connection between the first device and the second device includes: scanning Bluetooth devices within a surrounding area of the first device, paring the first device with a second device if the second device is scanned, and establishing the Bluetooth connection between the first device and the second device if the first device and the second device are successfully paired.

At step S102, a first data packet is sent to the second device and a second data packet sent by the second device is received based on a Bluetooth connection between the first device and the second device. Both the first data packet and the second data packet are used for a wireless communication between the first device and the second device.

The first data packet and the second data packet may include other information without limitation herein.

In an implementation, the first device is configured as a creator of an access point (AP) or a group owner of a group. The first data packet carries a connection password of a wireless network, a channel where the first device is located, a server set identifier (SSID) of a wireless network where the first device is located, a media access control (MAC) address of the first device, an internet protocol (IP) address assigned to the second device, an access point nonce (ANonce), a third secret key, a CAP identification of the first device or the like.

In an implementation, the second device is configured as a client of an AP created by the first device, i.e., the second device is configured as a station (STA). Alternatively, the second device is configured as a group client of a group created by the first device. The second data packet carries a MAC address of the second device, a supplicant nonce, and a CAP identification of the second device, and so on.

It should be noted that, if the first device is a group owner, the connection password includes a password for joining in the group created by the first device. The ANonce is a random number generated by the first device. The SNonce is a random number generated by the second device. The third secret key may include other information without limitation herein. For example, the third secret key is used for a groupcast communication and/or a broadcast communication between the first device and multiple second devices. For example, the third secret key may include a group temporal key (GTK). The third secret key may be generated by any key generation method in the related art, which is not limited herein.

In an implementation, generating the third secret key may include: splicing the MAC address of the first device and a group nonce (GNonce) to obtain a first spliced result, and generating the GTK based on the first spliced result and a group master key (GMK). It should be noted that GNonce is a random number generated by the first device. ANonce and GNonce are different random numbers.

In some examples, key derivation may be performed for the GMK based on the first spliced result to obtain the GTK. It should be noted that the key derivation may be performed for the GMK by using any key derivation method in the related art. The key derivation method may include a pseudo-random function (PRF).

The execution order of the step of sending the first data packet to the second device and the step of receiving the second data packet sent by the second device are not limited herein. For example, the second data packet sent by the second device can be received after the first data packet is sent to the second device. Or the first data packet may be sent to the second device after the second data packet sent by the second device can be received.

At step S103, a wireless connection between the first device and the second device is established. The establishing of the wireless connection does not include an interaction process of handshake messages.

It should be noted that the handshake messages may include handshake messages defined by any wireless communication protocol in the related art, such as the four-way handshake messages.

In an implementation, establishing the wireless connection between the first device and the second device includes: creating a wireless access point, or creating a group and setting the first device as an owner of the group; receiving an authentication request message (Auth Request for short) sent by the second device; sending an authentication response message (Auth Response for short) to the second device; receiving an association request message (Assoc Request for short) sent by the second device; and sending an association response message (Assoc Response for short) to the second device. It should be noted that the establishing of the wireless connection may include an interaction process of two Auth messages (i.e., the Auth Request and the Auth Response), and an interaction process of two Assoc messages (i.e., the Assoc Request and the Assoc Response).

In an implementation, establishing the wireless connection between the first device and the second device includes: installing the first secret key and the third secret key. It should be noted that the first secret key and the third secret key may be different secret keys. The first secret key may include other information without limitation herein. For example, the first secret key is used for a unicast communication between the first device and the second device. For example, the first secret key may include a pairwise temporal key (PTK). Regarding details of generating the first secret key, reference may be made to the following embodiments, which is not elaborated.

In some examples, establishing the wireless connection between the first device and the second device includes: installing the PTK and the GTK.

At step S104, the wireless communication between the first device and the second device is performed based on the first data packet and the second data packet.

In an implementation, performing the wireless communication between the first device and the second device based on the first data packet and the second data packet includes: extracting first target data required for the wireless communication from the first data packet and the second data packet and/or generating first target data based on the first data packet and the second data packet; and performing the wireless communication between the first device and the second device based on the first target data. The first target data may include other data without limitation herein. For example, the first target data may include the first secret key, the third secret key, the IP address of the first device, the MAC address of the first device, the IP address of the second device, the MAC address of the second device, or the like.

It should be noted that the first target data may be generated based on the first data packet and the second packet by using any wireless communication method in the related art, which is not limited herein.

In an implantation, before performing the wireless communication between the first device and the second device, the method further includes: receiving an address resolution protocol (ARP) request message (ARP Request for short) sent by the second device, and sending an ARP response message (ARP Response for short) to the second device. The ARP Request carries the MAC address of the second device, and the ARP Response carries the MAC address of the first device. In this way, the MAC addresses of the first device and the second device may be shared between the first device and the second device through the interaction process of two ARP messages (i.e., the ARP Request and the ARP Response).

With the wireless communication method provided in the embodiment of the present disclosure, a Bluetooth connection between a first device and a second device is established. A first data packet is sent to the second device and a second data packet sent by the second device is received based on a Bluetooth connection between the first device and the second device. Both the first data packet and the second data packet are used for a wireless communication between the first device and the second device. A wireless connection between the first device and the second device is established. The establishing of the wireless connection does not include an interaction process of handshake messages. The wireless communication between the first device and the second device is performed based on the first data packet and the second data packet. In this way, transmission of the first data packet and the second data packet can be performed through the Bluetooth connection between two devices. That is, two data packets can be shared between the two devices through the Bluetooth connection, so that the interaction process of handshake messages can be omitted during the establishing of the wireless connection, thereby facilitating reducing the number of message interactions and shortening consumption time of the message interactions, and thus shortening the time of the establishing of the wireless connection and improving the efficiency of the establishing of the wireless connection.

Figure 2:
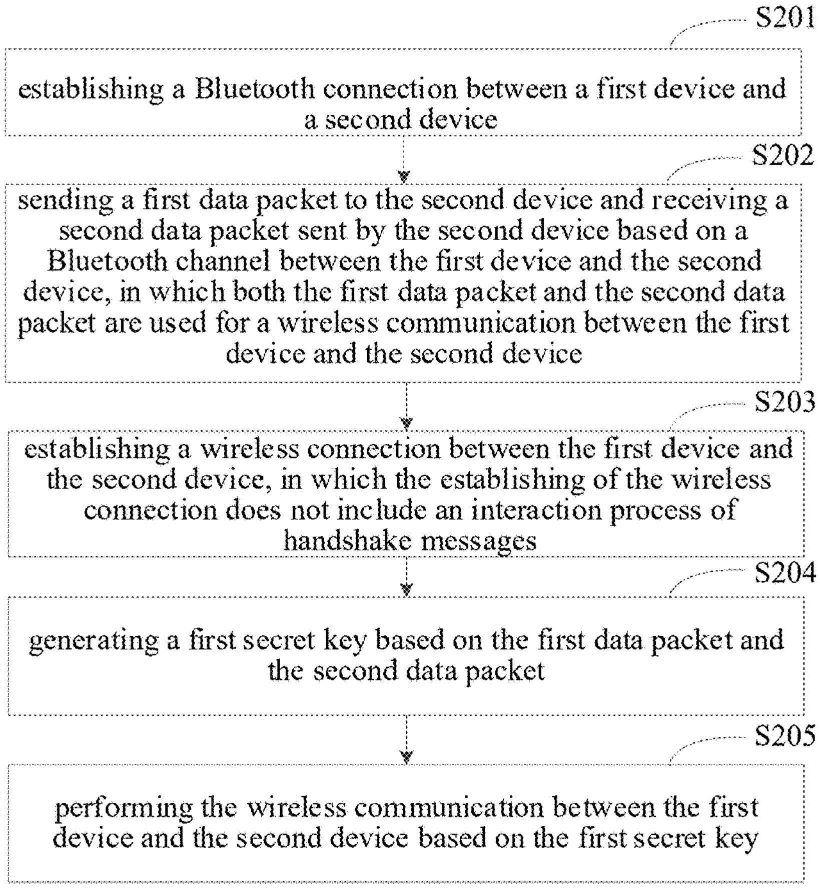
FIG. 2 illustrates a flowchart of a wireless communication method according to an embodiment.

FIG. 2 is a flowchart of a wireless communication method according to another embodiment. As shown in FIG. 2, the wireless communication method according to the embodiment of the present disclosure includes the following steps.

At step S201, a Bluetooth connection between a first device and a second device is established.

At step S202, a first data packet is sent to the second device and a second data packet sent by the second device is received based on a Bluetooth connection between the first device and the second device. Both the first data packet and the second data packet are used for a wireless communication between the first device and the second device.

At step S203, a wireless connection between the first device and the second device is established. The establishing of the wireless connection does not include an interaction process of handshake messages.

Regarding related contents of the steps S201-S203, reference can be made to the above embodiments, which is not elaborated here.

At step S204, a first secret key is generated based on the first data packet and the second data packet.

It should be noted that the execution order of the steps S204 and S203 is not limited herein. For example, the step S204 can be executed after the step S203, or the step S203 is executed after the step S204.

It should be noted that regarding the detailed contents of the first secret key, reference can be made to the above embodiments, which is not elaborated here. The first secret key can be generated by any key generation method in the related art, which is not limited herein.

In an implementation, the first data packet carries a connection password of a wireless network, an SSID of the wireless network, a MAC address of the first device, and an ANonce. The second data packet carries a MAC address of the second device and a SNonce.

Generating the first secret key based on the first data packet and the second data packet may include: generating a PMK based on the connection password and the SSID of the wireless network, splicing the MAC address of the first device, the MAC address of the second device, the ANonce and the SNonce to obtain a second spliced result, and generating the PTK based on the second spliced result and the PMK.

In some examples, generating the PMK based on the connection password and the SSID of the wireless network may include performing key derivation for the connection password of the wireless network based on the SSID of the wireless network to obtain the PMK. It should be noted that the key derivation may be performed to obtain the GMK by using any key derivation method in the related art. The key derivation method may include a password-based key derivation function 2 (PBKDF2).

In some examples, generating the PTK based on the second spliced result and the PMK may include performing key derivation for the PMK based on the second spliced result to obtain the PTK. It should be noted that the key derivation may be performed to obtain the PTK by using any key derivation method in the related art. The key derivation method may include a PRF.

In some examples, splicing the MAC address of the first device, the MAC address of the second device, the ANonce and the SNonce to obtain the second spliced result includes: obtaining a first maximum value and a first minimum value between the first MAC address of the first device, the MAC address of the second device, obtaining a second maximum value and a second minimum value between the ANonce and the SNonce, splicing the first maximum value, the first minimum value, the second maximum value and the second minimum value in an order of the first minimum value, the first maximum value, the second minimum value and the second maximum value to obtain the second spliced result.

At step S205, the wireless communication between the first device and the second device is performed based on the first secret key.

It should be noted that regarding related contents of performing the wireless communication between the first device and the second device based on the first secret key, any wireless communication method in the related art can be used to implement, which is not limited herein.

In an implementation, performing the wireless communication between the first device and the second device based on the first secret key includes: encrypting a seventh data packet based on the first secret key to obtain a first encrypted data packet, and sending the first encrypted data packet to the second device based on the Bluetooth connection between the first device and the second device.

In an implementation, performing the wireless communication between the first device and the second device based on the first secret key includes: receiving a second encrypted data packet sent by the second device based on the Bluetooth connection between the first device and the second device, and decrypting the second encrypted data packet based on the first secret key to obtain an eighth data packet.

With the wireless communication method provided in the embodiment of the disclosure, a first secret key is generated based on a first data packet and a second data packet. A wireless communication between the first device and the second device is performed based on the first secret key. In this way, by comprehensively considering the first data packet and the second data packet to generate the first secret key, the wireless communication between two devices can be performed.

Figure 3:
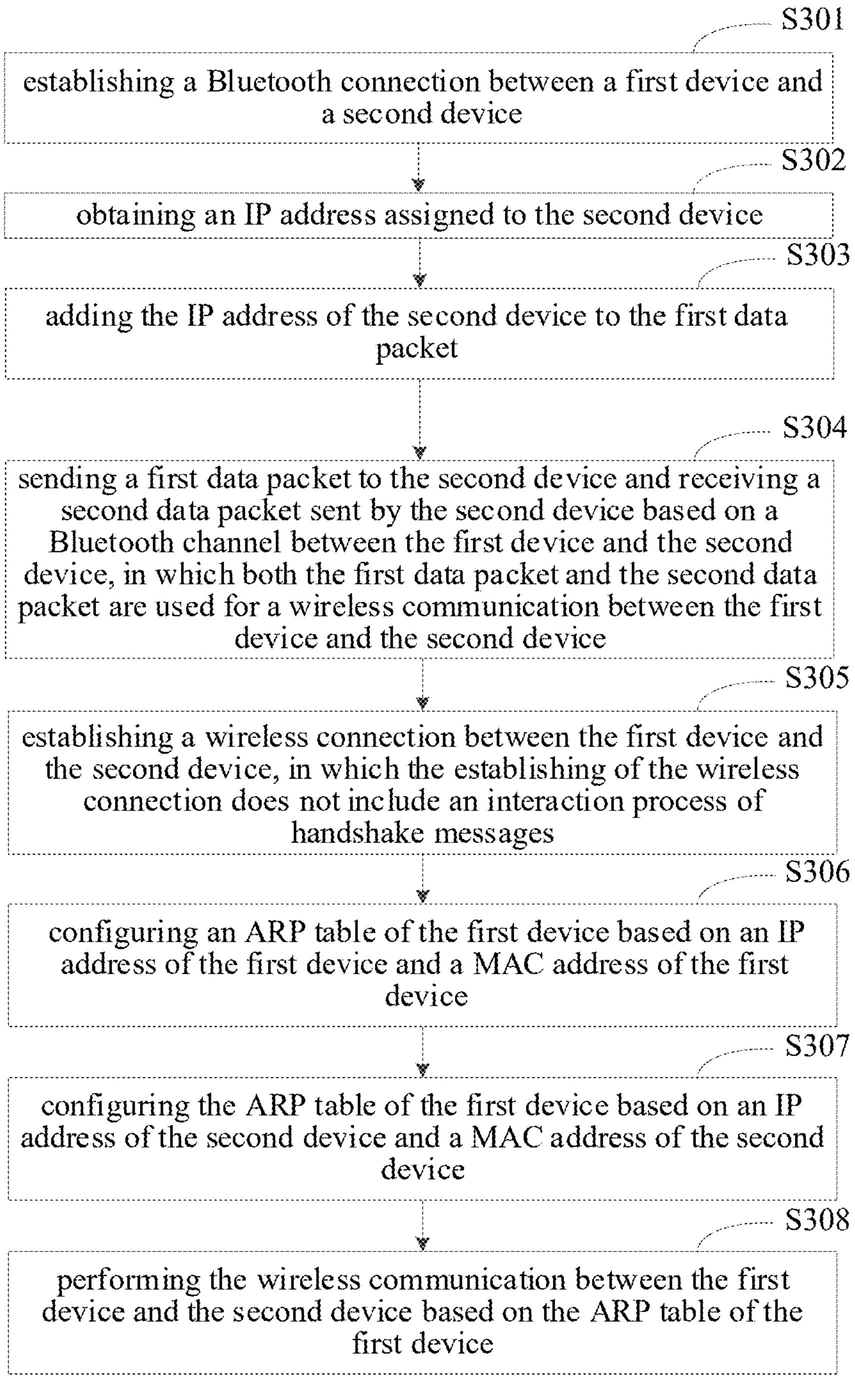
FIG. 3 illustrates a flowchart of a wireless communication method according to an embodiment.

FIG. 3 is a flowchart of a wireless communication method according to another embodiment. As shown in FIG. 3, the wireless communication method according to the embodiment of the present disclosure includes the following steps.

At step S301, a Bluetooth connection between a first device and a second device is established.

Regarding related contents of the step S301, reference can be made to the above embodiments, which is not elaborated here.

At step S302, an IP address assigned to the second device is obtained.

At step S303, the IP address of the second device is added to a first data packet.

It should be noted that the IP address assigned to the second device may be obtained by any IP address assignment method in the related art, which is not limited herein. The IP address of the second device refers to the IP address assigned to the second device. The first data packet carries the IP address of the second device.

In an implementation, obtaining the IP address assigned to the second device includes receiving the IP address assigned to the second device sent by a dynamic host configuration protocol (DHCP) server.

In an implementation, obtaining the IP address assigned to the second device includes: sending a DHCP discover message (DHCP Discover for short) to the DHCP server, receiving a DHCP acknowledgement message (DHCP ACK for short) sent by the DHCP server, sending a DHCP request message (DHCP Request for short) to the DHCP server, and receiving a DHCP response message (DHCP Response for short) sent by the DHCP server.

In an implementation, obtaining the IP address assigned to the second device includes: screening out a target IP address from an IP address list as the IP address assigned to the second device. It should be noted that the IP address list includes multiple candidate IP addresses which are not occupied.

At step S304, a first data packet is sent to the second device and a second data packet sent by the second device is received based on a Bluetooth connection between the first device and the second device. Both the first data packet and the second data packet are used for a wireless communication between the first device and the second device.

At step S305, a wireless connection between the first device and the second device is established. The establishing of the wireless connection does not include an interaction process of handshake messages.

Regarding related contents of the steps S304-S305, reference can be made to the above embodiments, which is not elaborated here.

At step S306, an ARP table of the first device is configured based on the IP address and the MAC address of the first device.

At step S307, the ARP table of the first device is configured based on the IP address and the MAC address of the second device.

It should be noted that the second data packet carries the MAC address of the second device.

In an implementation, configuring the ARP table of the first device based on the IP address and the MAC address of the first device includes: establishing a mapping relation between the IP address of the first device and the MAC address of the first device, and storing the mapping relation between the IP address of the first device and the MAC address of the first device into the ARP table of the first device.

In an implementation, configuring the ARP table of the first device based on the IP address and the MAC address of the second device includes: establishing a mapping relation between the IP address of the second device and the MAC address of the second device, and storing the mapping relation between the IP address of the second device and the MAC address of the second device into the ARP table of the first device.

At step S308, the wireless communication between the first device and the second device is performed based on the ARP table of the first device.

It should be noted that regarding related contents of performing the wireless communication between the first device and the second device based on the ARP table of the first device, any wireless communication method in the related art can be used to implement, which is not limited herein.

In an implementation, performing the wireless communication between the first device and the second device based on the ARP table of the first device includes: obtaining a MAC address having a mapping relation with the IP address of the second device from the ARP table of the first device as the MAC address of the second device, and performing the wireless communication between the first device and the second device based on the MAC address of the second device. For example, the MAC address of the second device may be added to a first encrypted data packet, and the first encrypted data packet is sent to the second device.

In an implementation, performing the wireless communication between the first device and the second device based on the ARP table of the first device includes: receiving a second encrypted data packet sent by the second device, obtaining a candidate MAC address having a mapping relation with the IP address of the second device from the ARP table of the first device as the MAC address of the second device, and performing an identity check on the second encrypted data packet based on the MAC address of the second device.

In some examples, performing the identity check on the second encrypted data packet based on the MAC address of the second device includes: extracting the MAC address from the second encrypted data packet, determining that the second encrypted data packet fails to pass the identity check if the extracted MAC address is inconsistent with the MAC address of the second device, and determining that the second encrypted data packet passes the identity check if the extracted MAC address is consistent with the MAC address of the second device.

With the wireless communication method provided in the embodiment of the disclosure, before a first data packet is sent to a second device, an IP address assigned to the second device is obtained and added to the first data packet, so that the IP address of the second device may be shared between two devices through a Bluetooth connection, and an interaction process of DHCP messages can be omitted during the wireless communication, thereby facilitating reducing the number of message interactions and shortening consumption time of the message interactions, and thus shortening the time of the wireless communication and improving the efficiency of the wireless communication. In addition, an ARP table of a first device is configured based on an IP address and a MAC address of the first device, the ARP table of a first device is configured based on an IP address and a MAC address of the second device, and the wireless communication between the first device and the second device is performed based on the ARP table of the first device. The ARP table of the first device is configured by comprehensively considering the IP addresses and the MAC addresses of the two devices, so that an interaction process of ARP messages can be omitted during the wireless communication, thereby facilitating reducing the number of message interactions and shortening consumption time of the message interactions, and thus shortening the time of the wireless communication and improving the efficiency of the wireless communication.

On the basis of any of the above embodiments, the first data packet further carries the IP address and the MAC address of the first device. In this way, the IP address and the MAC address of the first device may be shared between two devices through the Bluetooth connection, so that the second device may configure the ARP table by considering the IP address and the MAC address of the first device, which may omit the interaction process of ARP messages can be omitted during the wireless communication, thereby facilitating reducing the number of message interactions and shortening consumption time of the message interactions, and thus shortening the time of the wireless communication and improving the efficiency of the wireless communication.

Figure 4:
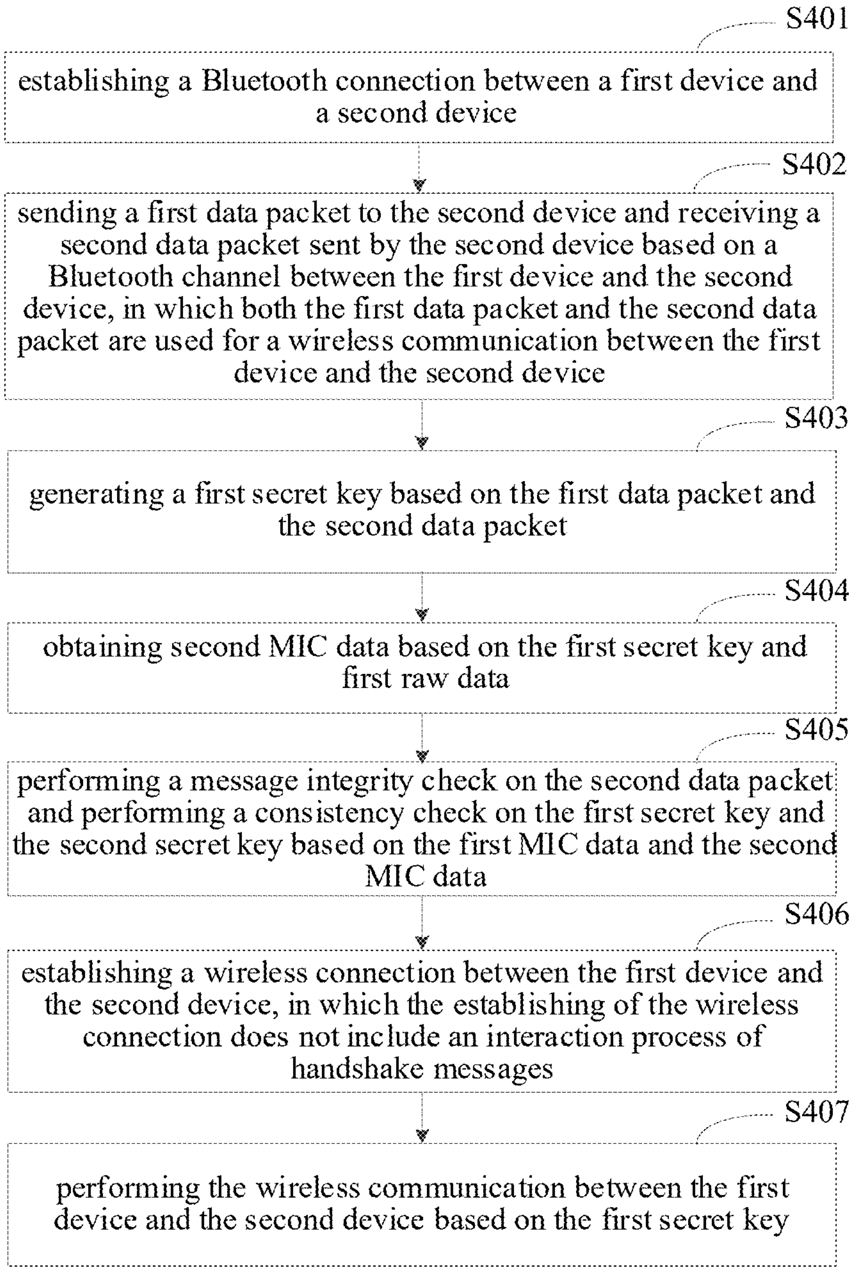
FIG. 4 illustrates a flowchart of a wireless communication method according to an embodiment.

FIG. 4 is a flowchart of a wireless communication method according to another embodiment. As shown in FIG. 4, the wireless communication method according to the embodiment of the present disclosure includes the following steps.

At step S401, a Bluetooth connection between a first device and a second device is established.

At step S402, a first data packet is sent to the second device and a second data packet sent by the second device is received based on a Bluetooth connection between the first device and the second device. Both the first data packet and the second data packet are used for a wireless communication between the first device and the second device.

At step S403, a first secret key is generated based on the first data packet and the second data packet.

Regarding related contents of the steps S401-S403, reference can be made to the above embodiments, which is not elaborated here.

At step S404, second message integrity check (MIC) data is obtained based on the first secret key and first raw data.

It should be noted that the second data packet carries first MIC data and the first raw data. The first MIC data is obtained based on a second secret key locally in the second device and the first raw data. The first raw data may include other data without limitation herein. For example, the first raw data may include a MAC address of the second device, a SNonce and a CAP identification of the second device. Regarding related contents of the second secret key, and the first MIC data, reference can be made to the following embodiments, which is not elaborated here.

It should be noted that the second MIC data can be obtained based on the first secret key and the first raw data by any MIC data obtaining method in the related art, which is not limited herein. The MIC data obtaining method may include a Michael algorithm, an advanced encryption standard (AES) algorithm or the like.

In an implementation, the first secret key is a PTK including a key confirmation key (KCK). Obtaining the second MIC data based on the first secret key and the first raw data includes encrypting the first raw data based on the KCK to obtain the second MIC data.

At step S405, a message integrity check is performed on the second data packet and a consistency check is performed on the first secret key and the second secret key based on the first MIC data and the second MIC data.

In an implementation, performing a message integrity check on the second data packet and performing a consistency check on the first secret key and the second secret key based on the first MIC data and the second MIC data includes: if the first MIC data is consistent with the second MIC data, determining that the second data packet passes the message integrity check and that the first secret key and the second secret key pass the consistency check; if the first MIC data is inconsistent with the second MIC data, determining that the second data packet fails to pass the message integrity check and that the first secret key and the second secret key fail to pass the consistency check.

In an implementation, the method further includes: sending third indication information to the second device if the second data packet fails to pass the message integrity check and/or the first secret key and the second secret key fail to pass the consistency check, and performing the step of sending the first data packet to the second device based on the Bluetooth connection between the first device and the second device and subsequent steps. The third indication information is used for instructing the second device to resend the second data packet.

At step S406, a wireless connection between the first device and the second device is established. The establishing of the wireless connection does not include an interaction process of handshake messages.

At step S407, the wireless communication between the first device and the second device is performed based on the first secret key.

Regarding related contents of the steps S406-S407, reference can be made to the above embodiments, which is not elaborated here.

With the wireless communication method provided in the embodiment of the present disclosure, before a wireless connection between a first device and a second device is established, second MIC data is obtained based on a first secret key and first raw data, a message integrity check is performed on a second data packet and a consistency check is performed on the first secret key and a second secret key based on first MIC data and the second MIC data, which may prevent from the second data packet being falsified during transmission, improve safety of the wireless communication and verify whether the first secret key is consistent with the second secret key.

Figure 5:
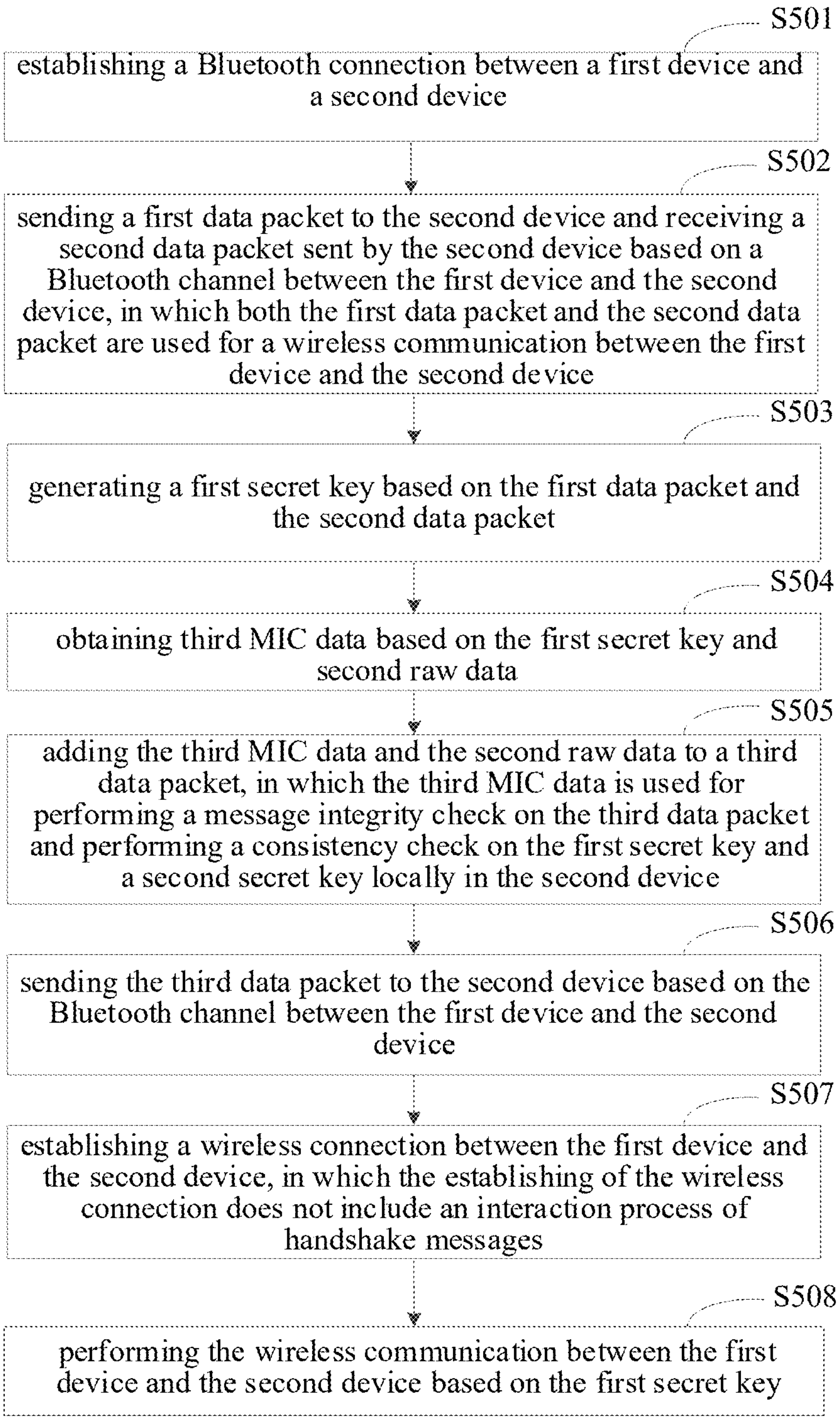
FIG. 5 illustrates a flowchart of a wireless communication method according to an embodiment.

FIG. 5 is a flowchart of a wireless communication method according to another embodiment. As shown in FIG. 5, the wireless communication method according to the embodiment of the present disclosure includes the following steps.

At step S501, a Bluetooth connection between a first device and a second device is established.

At step S502, a first data packet is sent to the second device and a second data packet sent by the second device is received based on a Bluetooth connection between the first device and the second device. Both the first data packet and the second data packet are used for a wireless communication between the first device and the second device.

At step S503, a first secret key is generated based on the first data packet and the second data packet.

Regarding related contents of the steps S501-S503, reference can be made to the above embodiments, which is not elaborated here.

At step S504, third MIC data is obtained based on the first secret key and second raw data.

The second raw data may include other data without limitation herein. For example, the second raw data includes a third secret key. The third secret key is used for a groupcast communication and/or a broadcast communication between the first device and multiple second devices. Regarding related contents of the third secret key, reference can be made to the above embodiments, which is not elaborated here.

It should be noted that regarding related contents of the step S504, reference can be made to the related contents of the step S404 in the above embodiments, which is not elaborated here.

At step S505, the third MIC data and the second raw data are added to a third data packet. The third MIC data is used for performing a message integrity check on the third data packet and performing a consistency check on the first secret key and a second secret key locally in the second device.

At step S506, the third data packet is sent to the second device based on a Bluetooth connection between the first device and the second device.

It should be noted that the third data packet carries the third MIC data and the second raw data.

At step S507, a wireless connection between the first device and the second device is established. The establishing of the wireless connection does not include an interaction process of handshake messages.

At step S508, the wireless communication between the first device and the second device is performed based on the first secret key.

Regarding related contents of the steps S507-S508, reference can be made to the above embodiments, which is not elaborated here.

With the wireless communication method provided in the embodiment of the present disclosure, before a wireless connection between a first device and a second device is established, third MIC data is obtained based on a first secret key and second raw data, third MIC data and the second raw data are added to a third data packet. The third MIC data is used for performing a message integrity check on the third data packet and performing a consistency check on the first secret key and a second secret key locally in the second device. The third data packet is sent to the second device based on a Bluetooth connection between the first device and the second device. In this way, the third data packet is prevented from being falsified during transmission, thereby improving safety of the wireless communication and verifying whether the first secret key is consistent with the second secret key.

Figure 6:
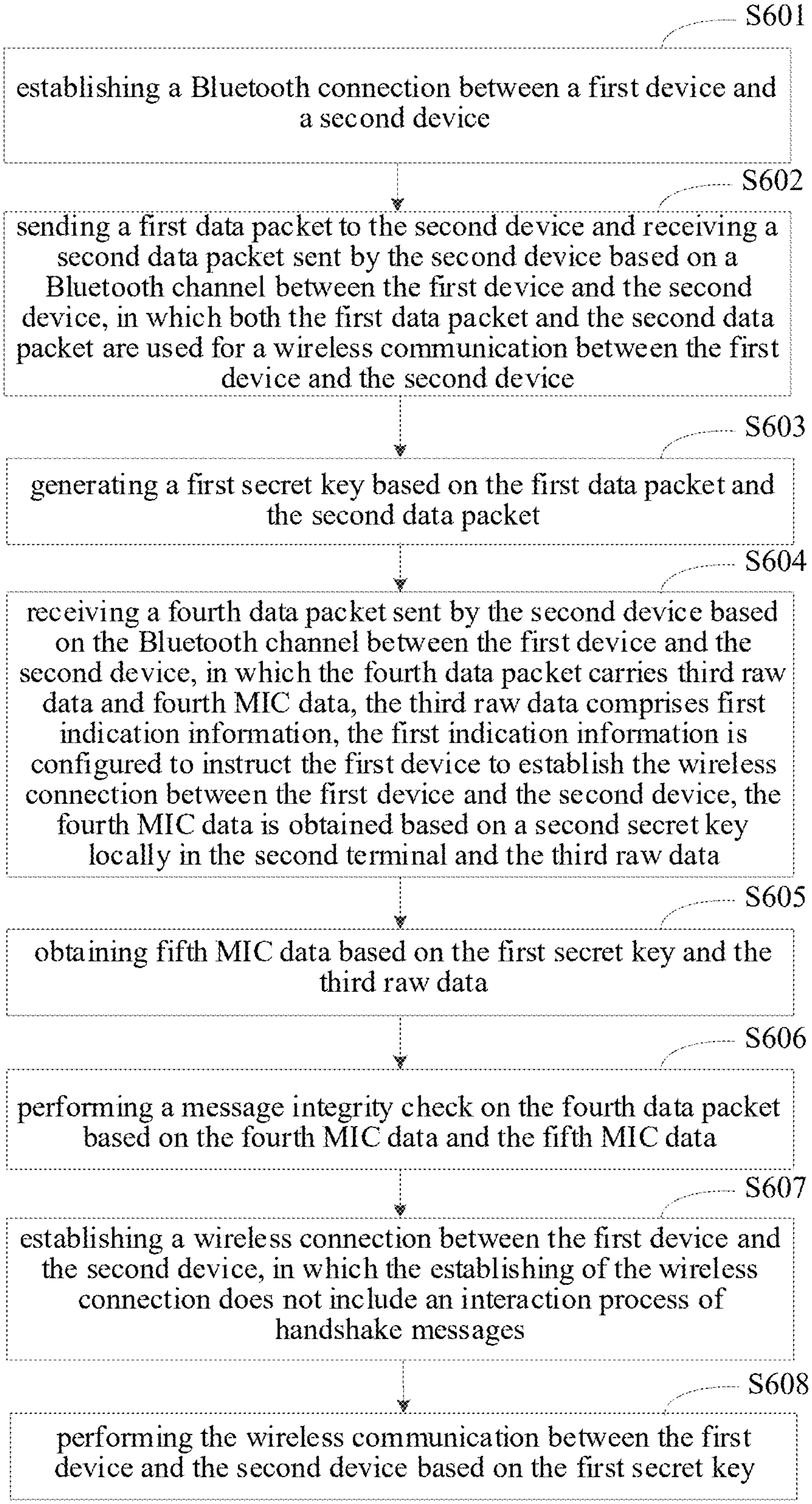
FIG. 6 illustrates a flowchart of a wireless communication method according to an embodiment.

FIG. 6 is a flowchart of a wireless communication method according to another embodiment. As shown in FIG. 6, the wireless communication method according to the embodiment of the present disclosure includes the following steps.

At step S601, a Bluetooth connection between a first device and a second device is established.

At step S602, a first data packet is sent to the second device and a second data packet sent by the second device is received based on a Bluetooth connection between the first device and the second device. Both the first data packet and the second data packet are used for a wireless communication between the first device and the second device.

At step S603, a first secret key is generated based on the first data packet and the second data packet.

Regarding related contents of the steps S601-S603, reference can be made to the above embodiments, which is not elaborated here.

At step S604, a fourth data packet sent by the second device is received based on a Bluetooth connection between the first device and the second device. The fourth data packet carries third raw data and fourth MIC data. The third raw data includes first indication information for instructing the first device to establish a wireless connection with the second device. The fourth MIC data is obtained based on a second secret key locally in the second device and the third raw data.

At step S605, fifth MIC data is obtained based on the first secret key and the third raw data.

At step S606, a message integrity check is performed on the fourth data packet based on the fourth MIC data and the fifth MIC data.

The third raw data may include other data without limitation herein. Regarding related contents of the fourth MIC data, reference can be made to the following embodiments; regarding related contents of the step S605, reference can be made to the related contents of the step S404 in the above embodiments; regarding related contents of the step S606, reference can be made to the related contents of the step S405 in the above embodiments, which are not elaborated here.

At step S607, a wireless connection between the first device and the second device is established. The establishing of the wireless connection does not include an interaction process of handshake messages.

At step S608, the wireless communication between the first device and the second device is performed based on the first secret key.

Regarding related contents of the steps S607-S608, reference can be made to the above embodiments, which is not elaborated here.

With the wireless communication method provided in the embodiment of the present disclosure, before a wireless connection between a first device and a second device is established, a fourth data packet sent by the second device is received based on a Bluetooth connection between the first device and the second device. The fourth data packet carries third raw data and fourth MIC data. The third raw data includes first indication information for instructing the first device to establish the wireless connection with the second device. The fourth MIC data is obtained based on a second secret key locally in the second device and the third raw data. Fifth MIC data is obtained based on the first secret key and the third raw data. A message integrity check is performed on the fourth data packet based on the fourth MIC data and the fifth MIC data. In this way, the fourth data packet is prevented from being falsified during transmission, thereby improving safety of the wireless communication.

Figure 7:
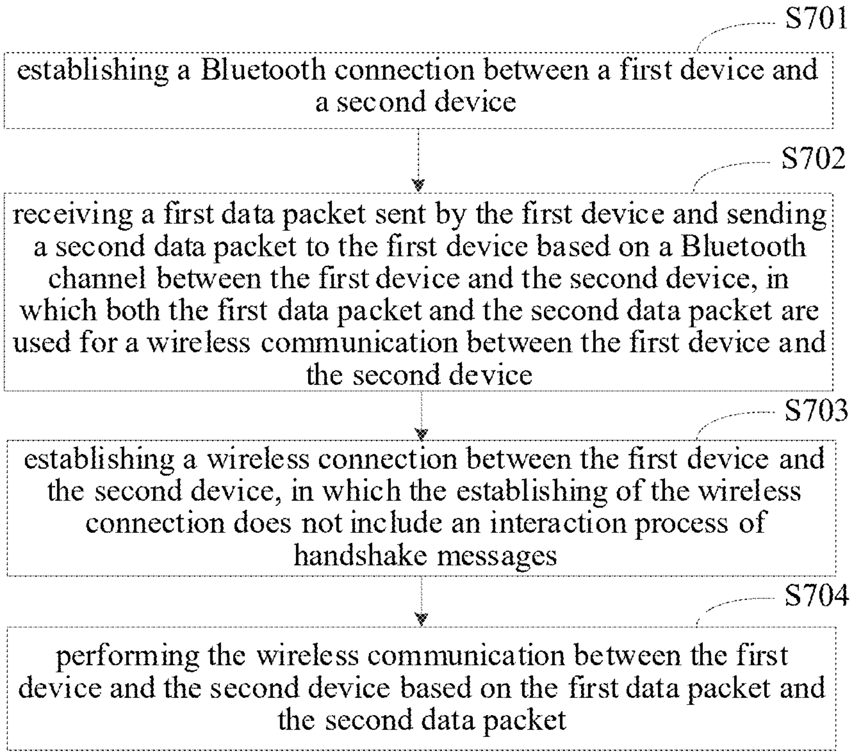
FIG. 7 illustrates a flowchart of a wireless communication method according to an embodiment.

FIG. 7 is a flowchart of a wireless communication method according to another embodiment. As shown in FIG. 7, the wireless communication method according to the embodiment of the present disclosure includes the following steps.

At step S701, a Bluetooth connection between a first device and a second device is established.

At step S702, a first data packet sent by the first device is received and a second data packet is sent to the first device based on a Bluetooth connection between the first device and the second device. Both the first data packet and the second data packet are used for a wireless communication between the first device and the second device.

At step S703, a wireless connection between the first device and the second device is established. The establishing of the wireless connection does not include an interaction process of handshake messages.

It should be noted that an execution subject of the wireless communication method disclosed in the embodiment may be an electronic device, such as including a mobile phone, a laptop, a desktop computer, a vehicle-mounted terminal, a smart home appliance, a wearable device, etc. The wearable device can include a wrist worn device (such as a smart watch, a smart bracelet), a head worn device, a foot worn device, etc. The wireless communication method of the embodiment can be executed by a wireless communication apparatus of an embodiment, and the wireless communication apparatus of the embodiment can be configured in any electronic device to execute the wireless communication method of the embodiment.

In an implementation, the execution subject may include the second device. The first device and the second device may be different electronic devices.

Regarding related contents of the steps S701-S703, reference can be made to the related contents of the steps S101-S103 in the above embodiments, which is not elaborated here.

In an implementation, the second device is configured as a client of an AP created by the first device, i.e., the second device is configured as a station (STA). Alternatively, the second device is configured as a group client of a group created by the first device. Establishing the wireless connection between the first device and the second device includes: sending an authentication request message (Auth Request for short) to the first device; receiving an authentication response message (Auth Response for short) sent by the first device; sending an association request message (Assoc Request for short) to the first device; and receiving an association response message (Assoc Response for short) sent by the first device. It should be noted that the establishing of the wireless connection may include an interaction process of two Auth messages (i.e., the Auth Request and the Auth Response), and an interaction process of two Assoc messages (i.e., the Assoc Request and the Assoc Response).

In an implementation, establishing the wireless connection between the first device and the second device includes: installing a second secret key and a third secret key. In some examples, establishing the wireless connection between the first device and the second device includes: installing the PTK and the GTK.

The execution order of the step of receiving the first data packet sent by the first device and the step of sending the second data packet to the first device are not limited herein. For example, the second data packet may be sent to the first device after the first data packet sent by the first device is received. Or the first data packet sent by the first device may be received after the second data packet is sent to the first device.

At step S704, the wireless communication between the first device and the second device is performed based on the first data packet and the second data packet.

Regarding related contents of the step S704, reference can be made to the related contents of the step S104 in the above embodiments, which is not elaborated here.

In an implementation, performing the wireless communication between the first device and the second device based on the first data packet and the second data packet includes: extracting second target data required for the wireless communication from the first data packet and the second data packet and/or generating second target data based on the first data packet and the second data packet; and performing the wireless communication between the first device and the second device based on the second target data. The second target data may include other data without limitation herein. For example, the second target data may include the second secret key, the third secret key, an IP address of the first device, a MAC address of the first device, an IP address of the second device, a MAC address of the second device, or the like.

In an implementation, performing the wireless communication between the first device and the second device based on the first data packet and the second data packet includes: generating the second secret key based on the first data packet and the second data packet, and performing the wireless communication between the first device and the second device based on the second secret key. In this way, the second secret key is generated by comprehensively considering the first data packet and the second data packet to perform the wireless communication between two devices.

Regarding related contents of the second secret key, reference can be made to the related contents of the first secret key in the above embodiments, which is not elaborated here. In some examples, the second secret key is used for a unicast communication between the first device and the second device.

The execution order of the step of generating the second secret key based on the first data packet and the second data packet and the step S703 is not limited herein. For example, the step S703 may be executed after the second secret key is generated based on the first data packet and the second data packet. Or the second secret key is generated based on the first data packet and the second data packet after the step S703.

In an implementation, the first data packet carries an IP address assigned to the second device. In this way, the IP address of the second device may be shared between two devices through a Bluetooth connection, and an interaction process of DHCP messages can be omitted during the wireless communication, thereby facilitating reducing the number of message interactions and shortening consumption time of the message interactions, and thus shortening the time of the wireless communication and improving the efficiency of the wireless communication.

In an implementation, the second data packet carries a MAC address of the second device. In this way, the MAC address of the second device may be shared between two devices through the Bluetooth connection, so that an ARP table can be configured by the first device in consideration of the IP address and the MAC address of the second device, and an interaction process of ARP messages can be omitted during the wireless communication, thereby facilitating reducing the number of message interactions and shortening consumption time of the message interactions, and thus shortening the time of the wireless communication and improving the efficiency of the wireless communication.

In an implementation, the first data packet further carries an IP address and a MAC address of the first device. Performing the wireless communication between the first device and the second device based on the first data packet and the second data packet includes: configuring an address resolution protocol (ARP) table of the second device based on the IP address of the first device and the MAC address of the first device; configuring the ARP table of the second device based on the IP address of the second device and the MAC address of the second device; and performing the wireless communication between the first device and the second device based on the ARP table of the second device. In this way, the ARP table of the first device can be configured by comprehensively considering the IP addresses and the MAC addresses of the two devices, so that an interaction process of ARP messages can be omitted during the wireless communication, thereby facilitating reducing the number of message interactions and shortening consumption time of the message interactions, and thus shortening the time of the wireless communication and improving the efficiency of the wireless communication.

Regarding related contents of configuring the ARP table of the second device, reference can be made to the related contents of configuring the ARP table of the first device in the above embodiments, which is not elaborated here.

With the wireless communication method provided in the embodiment of the present disclosure, a Bluetooth connection between a first device and a second device is established. A first data packet sent by the first device is received and a second data packet is sent to the first device based on a Bluetooth connection between the first device and the second device. Both the first data packet and the second data packet are used for a wireless communication between the first device and the second device. A wireless connection between the first device and the second device is established. The establishing of the wireless connection does not include an interaction process of handshake messages. The wireless communication between the first device and the second device is performed based on the first data packet and the second data packet. In this way, transmission of the first data packet and the second data packet can be performed through the Bluetooth connection between two devices. That is, two data packets can be shared between the two devices through the Bluetooth connection, so that the interaction process of handshake messages can be omitted during the establishing of the wireless connection, thereby facilitating reducing the number of message interactions and shortening consumption time of the message interactions, and thus shortening the time of the establishing of the wireless connection and improving the efficiency of the establishing of the wireless connection.

Figure 8:
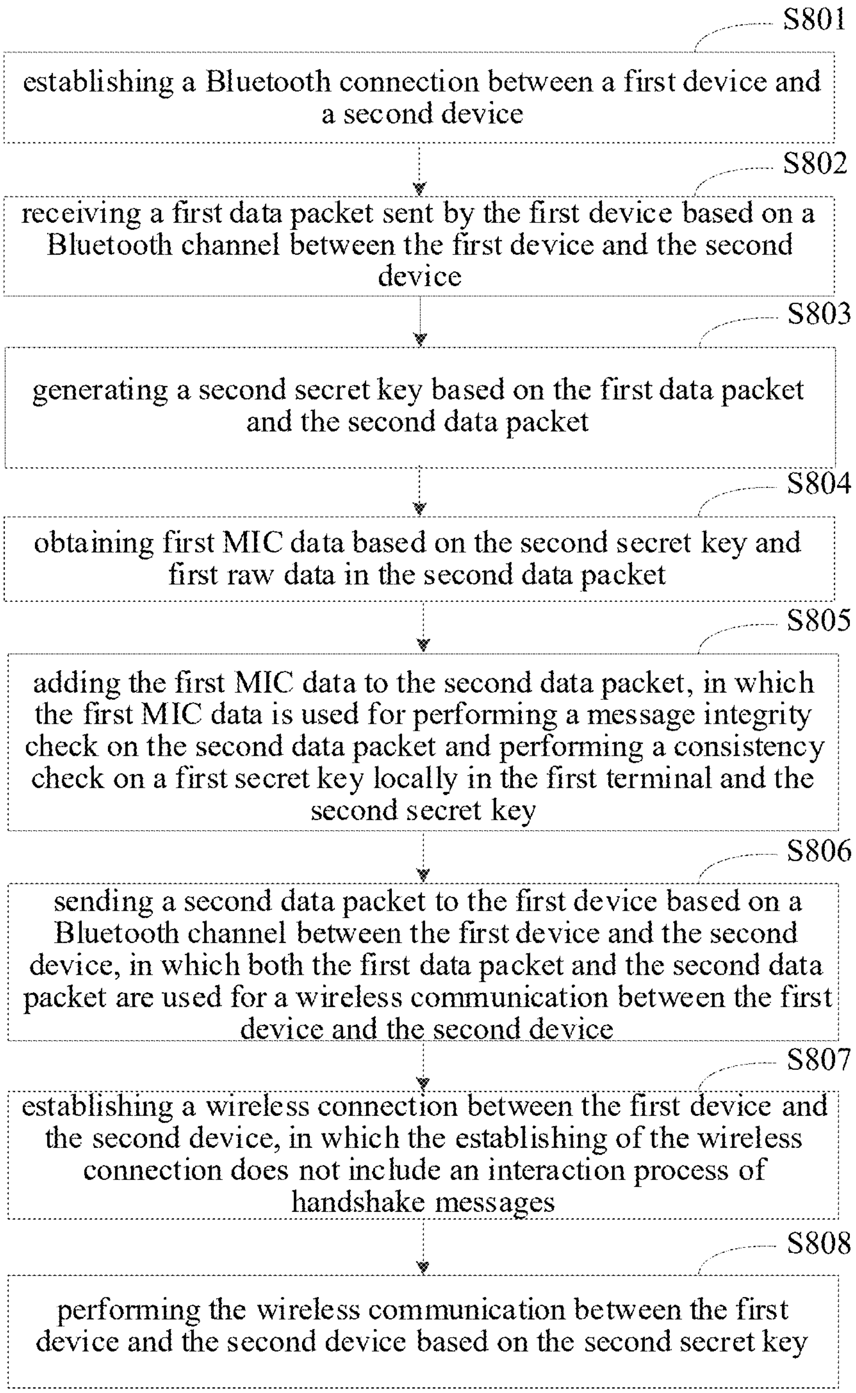
FIG. 8 illustrates a flowchart of a wireless communication method according to an embodiment.

FIG. 8 is a flowchart of a wireless communication method according to another embodiment. As shown in FIG. 8, the wireless communication method according to the embodiment of the present disclosure includes the following steps.

At step S801, a Bluetooth connection between a first device and a second device is established.

At step S802, a first data packet sent by the first device is received based on a Bluetooth connection between the first device and the second device.

At step S803, a second secret key is generated based on the first data packet and the second data packet.

Regarding related contents of the steps S801-S803, reference can be made to the above embodiments, which is not elaborated here.

At step S804, first message integrity check (MIC) data is obtained based on the second secret key and first raw data in the second data packet.

At step S805, the first MIC data is added to the second data packet. The first MIC data is used for performing a message integrity check on the second data packet and performing a consistency check on a first secret key locally in the first device and the second secret key.

It should be noted that the second data packet carries the first MIC data and the first raw data. Regarding related contents of the first raw data, reference can be made to the above embodiments, which is not elaborated here. Regarding related contents of the step S804, reference can be made to the related contents of the step S404 in the above embodiments, which is not elaborated here.

At step S806, a second data packet is sent to the first device based on the Bluetooth connection between the first device and the second device. Both the first data packet and the second data packet are used for a wireless communication between the first device and the second device.

At step S807, a wireless connection between the first device and the second device is established. The establishing of the wireless connection does not include an interaction process of handshake messages.

At step S808, the wireless communication between the first device and the second device is performed based on the second secret key.

Regarding related contents of the steps S806-S808, reference can be made to the above embodiments, which is not elaborated here.

With the wireless communication method provided in the embodiment of the present disclosure, before a second data packet is sent to a first device, first MIC data is obtained based on a second secret key and first raw data in the second data packet, the first MIC data is added to the second data packet. The first MIC data is used for performing a message integrity check on the second data packet and performing a consistency check on a first secret key locally in the first device and the second secret key. In this way, the second data packet is prevented from being falsified during transmission, thereby improving safety of the wireless communication and verifying whether the first secret key is consistent with the second secret key.

Figure 9:
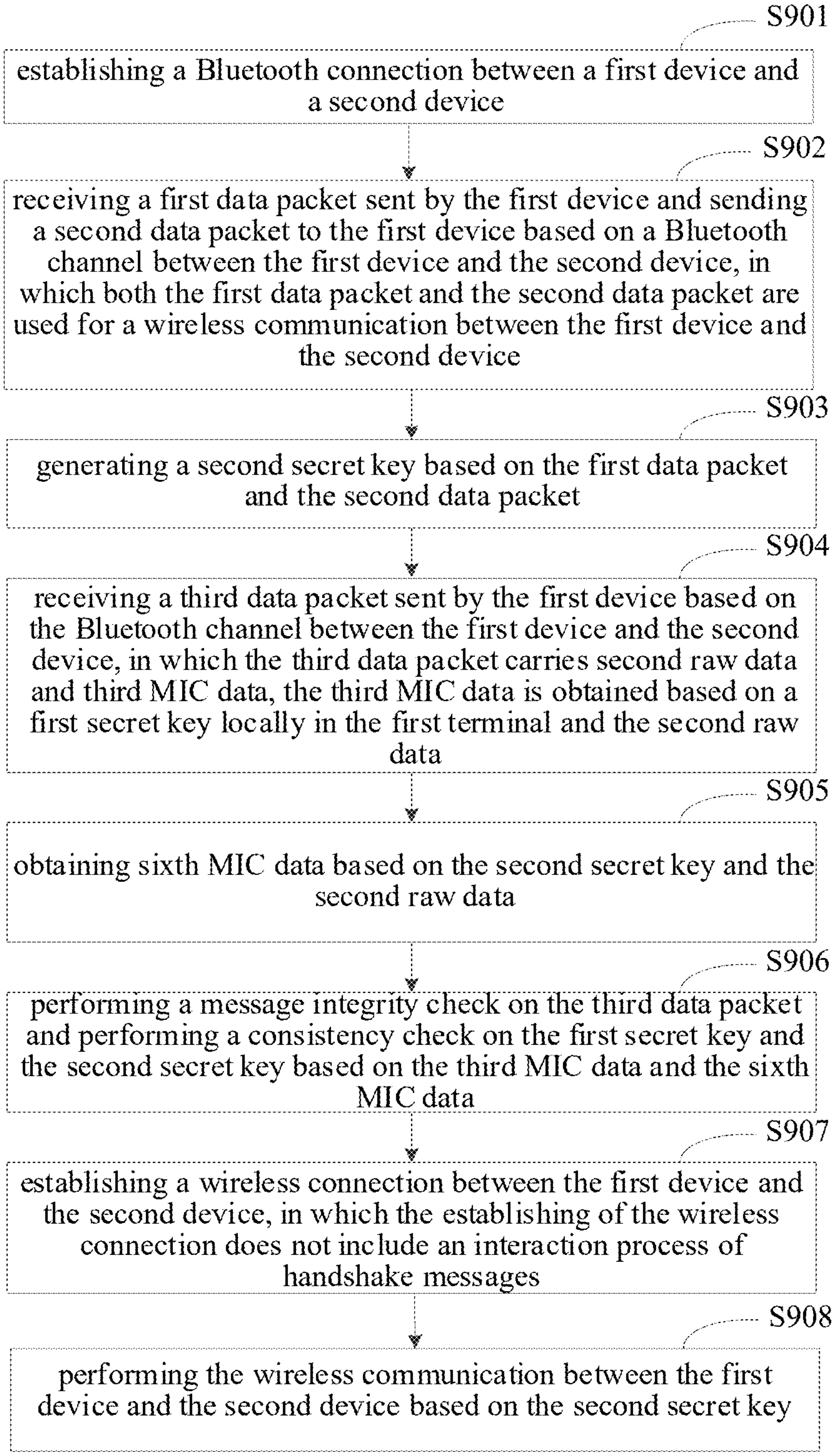
FIG. 9 illustrates a flowchart of a wireless communication method according to an embodiment.

FIG. 9 is a flowchart of a wireless communication method according to another embodiment. As shown in FIG. 9, the wireless communication method according to the embodiment of the present disclosure includes the following steps.

At step S901, a Bluetooth connection between a first device and a second device is established.

At step S902, a first data packet sent by the first device is received and a second data packet is sent to the first device based on a Bluetooth connection between the first device and the second device. Both the first data packet and the second data packet are used for a wireless communication between the first device and the second device.

At step S903, a second secret key is generated based on the first data packet and the second data packet.

Regarding related contents of the steps S901-S903, reference can be made to the above embodiments, which is not elaborated here.

At step S904, a third data packet sent by the first device is received based on through the Bluetooth connection between the first device and the second device. The third data packet carries third MIC data and second raw data. The third MIC data is obtained based on a first secret key locally in the first device and the second raw data.

At step S905, sixth message integrity check (MIC) data is obtained based on the second secret key and the second raw data.

At step S906, a message integrity check is performed on the third data packet and a consistency check is performed on the first secret key and the second secret key based on the third MIC data and the sixth MIC data.

It should be noted that regarding the related contents of the second raw data, reference can be made to the above embodiments; regarding the related contents of the step S905, reference can be made to the related contents of the step S404 in the above embodiments; regarding the related contents of the step S906, reference can be made to the related contents of the step S405 in the above embodiments, which are not elaborated here.

In an implementation, the second raw data includes a third secret key. The third secret key is used for a groupcast communication and/or a broadcast communication between the first device and multiple second devices.

At step S907, a wireless connection between the first device and the second device is established. The establishing of the wireless connection does not include an interaction process of handshake messages.

At step S908, the wireless communication between the first device and the second device is performed based on the second secret key.

Regarding related contents of the steps S907-S908, reference can be made to the above embodiments, which is not elaborated here.

With the wireless communication method provided in the embodiment of the present disclosure, before a wireless connection between a first device and a second device is established, a third data packet sent by the first device is received based on a Bluetooth connection between the first device and the second device. The third data packet carries third MIC data and second raw data. The third MIC data is obtained based on a first secret key locally in the first device and the second raw data. Sixth MIC data is obtained based on the second secret data and the second raw data. A message integrity check is performed on the third data packet and a consistency check is performed on the first secret key and the second secret key based on the third MIC data and the sixth MIC data. In this way, the third data packet is prevented from being falsified during transmission, thereby improving safety of the wireless communication and verifying whether the first secret key is consistent with the second secret key.

Figure 10:
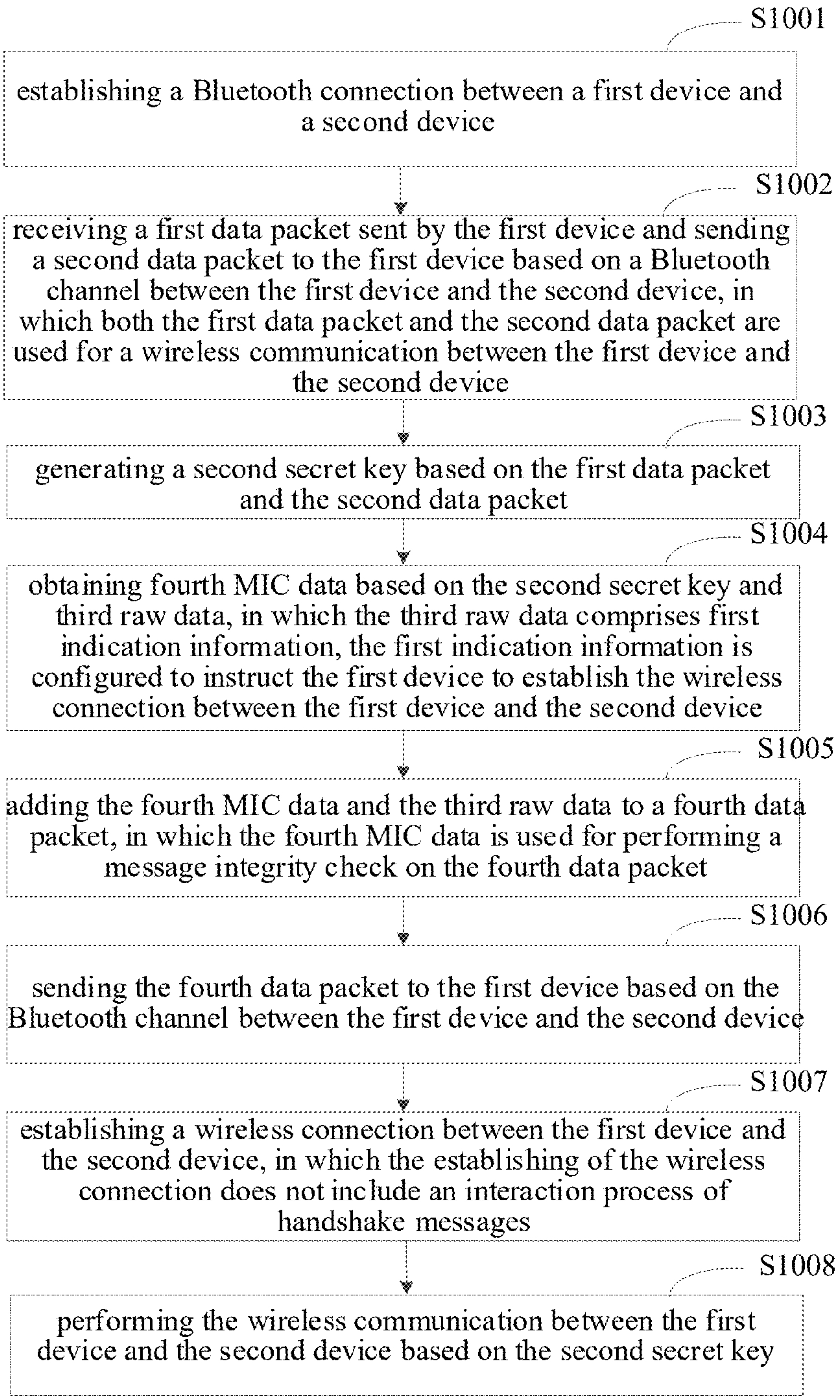
FIG. 10 illustrates a flowchart of a wireless communication method according to an embodiment.

FIG. 10 is a flowchart of a wireless communication method according to another embodiment. As shown in FIG. 10, the wireless communication method according to the embodiment of the present disclosure includes the following steps.

At step S1001, a Bluetooth connection between a first device and a second device is established.

At step S1002, a first data packet sent by the first device is received and a second data packet is sent to the first device based on a Bluetooth connection between the first device and the second device. Both the first data packet and the second data packet are used for a wireless communication between the first device and the second device.

At step S1003, a second secret key is generated based on the first data packet and the second data packet.

Regarding related contents of the steps S1001-S1003, reference can be made to the above embodiments, which is not elaborated here.

At step S1004, fourth message integrity check (MIC) data is obtained based on the second secret key and third raw data. The third raw data includes first indication information for instructing the first device to establish a wireless connection between the first device and the second device.

At step S1005, the fourth MIC data and the third raw data are added to the fourth data packet. The fourth MIC data is used for performing a message integrity check on the fourth data packet.

At step S1006, the fourth data packet is sent to the first device based on a Bluetooth connection between the first device and the second device.

It should be noted that the fourth data packet carries the fourth MIC data and the third raw data. The third raw data may include other data without limitation herein. Regarding related contents of the step S1004, reference can be made to the related contents of the step S404 in the above embodiments, which is not elaborated here.

At step S1007, the wireless connection between the first device and the second device is established. The establishing of the wireless connection does not include an interaction process of handshake messages.

At step S1008, the wireless communication between the first device and the second device is performed based on the second secret key.

Regarding related contents of the steps S1007-S1008, reference can be made to the above embodiments, which is not elaborated here.

With the wireless communication method provided in the embodiment of the present disclosure, before a wireless connection between a first device and a second device is established, fourth MIC data is obtained based on the second secret key and third raw data. The third raw data includes first indication information for instructing the first device to establish a wireless connection between the first device and the second device. The fourth MIC data and the third raw data are added to the fourth data packet. The fourth MIC data is used for performing a message integrity check on the fourth data packet. The fourth data packet is sent to the first device based on a Bluetooth connection between the first device and the second device. In this way, the fourth data packet is prevented from being falsified during transmission, thereby improving safety of the wireless communication.

Figure 11:
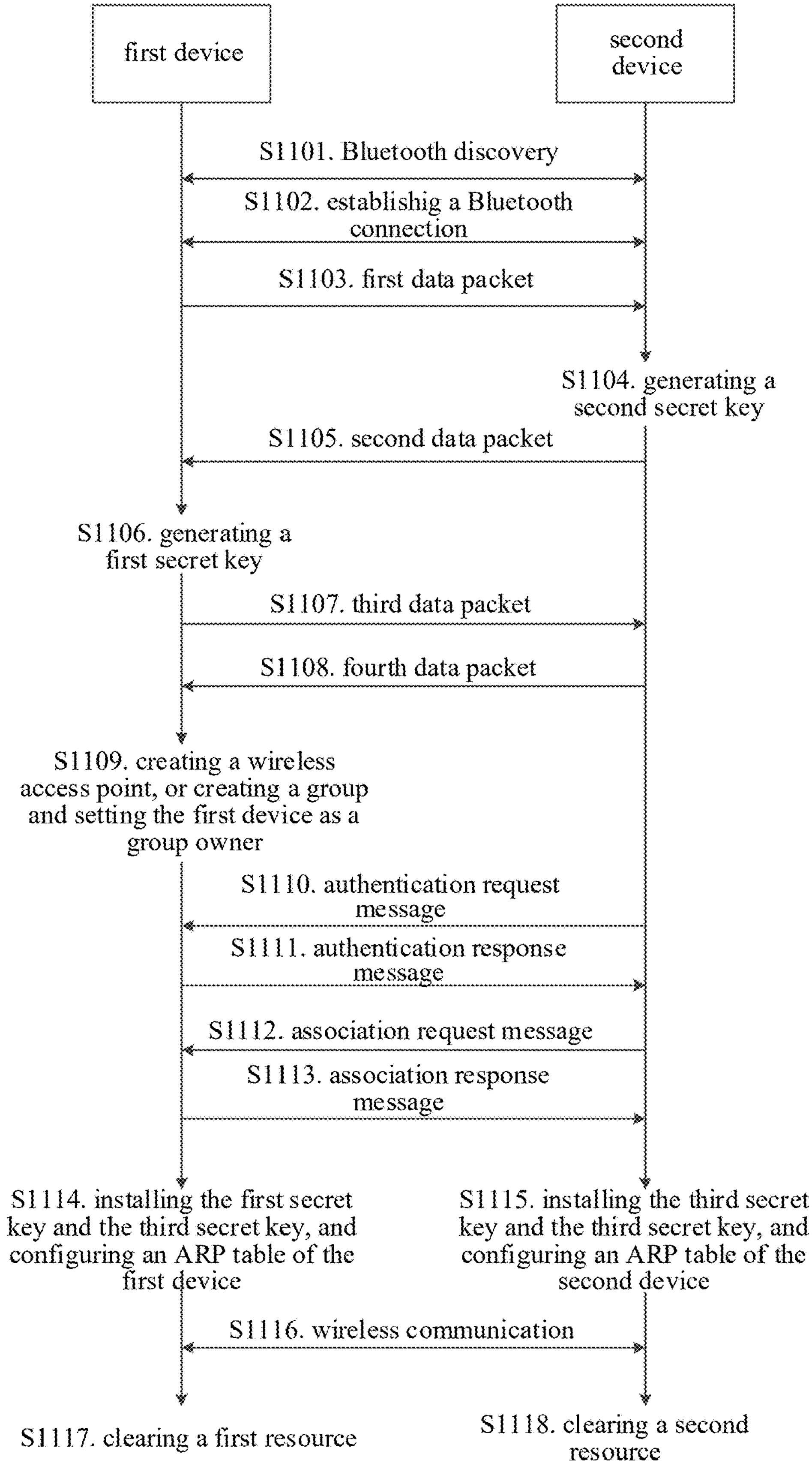
FIG. 11 illustrates a schematic diagram of an interaction process of a wireless communication method according to an embodiment.

FIG. 11 is a schematic diagram of an interaction process of a wireless communication method according to an embodiment. As shown in FIG. 11, the wireless communication method according to the embodiment of the present disclosure includes the following steps.

At step S1101, a first device and a second device perform Bluetooth discovery.

At step S1102, the first device and the second device establish a Bluetooth connection between the first device and the second device.

At step S1103, the first device sends a first data packet to the second device based on a Bluetooth connection between the first device and the second device.

At step S1104, the second device generates a second secret key based on the first data packet and the second data packet.

At step S1105, the second device sends a second data packet to the first device based on the Bluetooth connection between the first device and the second device.

At step S1106, the first device generates a first secret key based on the first data packet and the second data packet.

At step S1107, the first device sends a third data packet to the second device based on the Bluetooth connection between the first device and the second device. The third data packet carries a third secret key.

At step S1108, the second device sends a fourth data packet to the first device based on the Bluetooth connection between the first device and the second device.

At step S1109, the first device creates a wireless access point, or creates a group and sets the first device as a group owner.

At step S1110, the second device sends an authentication request message (Auth Request for short) to the first device.

At step S1111, the first device sends an authentication response message (Auth Response for short) to the second device.

At step S1112, the second device sends an association request message (Assoc Request for short) to the first device.

At step S1113, the first device sends an association response message (Assoc Response for short) to the second device.

At step S1114, the first device installs the first secret key and the third secret key, and configures an ARP table of the first device.

At step S1115, the second device installs the third secret key and the third secret key, and configures an ARP table of the second device.

At step S1116, the first device and the second device perform a wireless communication between the first device and the second device.

Regarding related contents of the steps S1101-S1116, reference can be made to the above embodiments, which is not elaborated here.

At step S1117, the first device clears a first resource after the wireless communication between the first device and the second device finishes.

At step S1118, the second device clears a first resource after the wireless communication between the first device and the second device finishes.

It should be noted that the first resource refers to a resource required by the first device for the wireless communication between the first device and the second device, which may be a local resource of the first device. The second resource refers to a resource required by the second device for the wireless communication between the first device and the second device, which may be a local resource of the second device. The first resource and the second resource may include other resources without limitation herein. For example, the first resource may include an IP address of the first device, an ARP table of the first device, the first secret key, the third secret key or the like. The second resource may include an IP address of the second device, an ARP table of the second device, the second secret key, the third secret key or the like.

In an implementation, before the ARP table of the first device is configured, the first device further configures the IP address of the first device. For example, the first device may configure a default IP address as the IP address of the first device.

In an implementation, the first data packet carries an IP address assigned to the second device. Before the ARP table of the second device is configured, the second device further configures the IP address assigned to the second device as the IP address of the second device.

Figure 12:
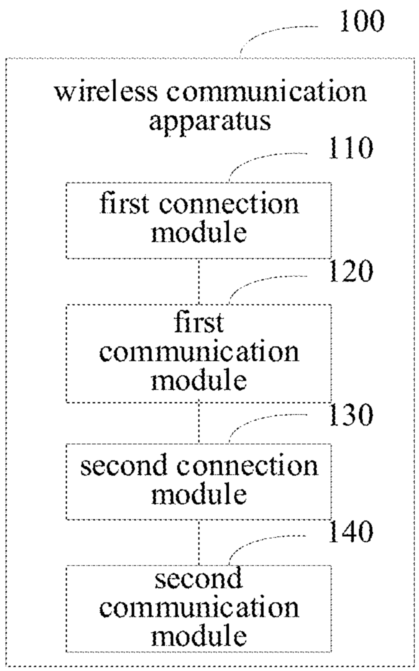
FIG. 12 illustrates a block diagram of a wireless communication apparatus according to an embodiment.

FIG. 12 illustrates a block diagram of a wireless communication apparatus according to an embodiment. As shown in FIG. 12, the wireless communication apparatus 100 of the embodiment of the disclosure includes a first connection module 110, a first communication module 120, a second connection module 130, and a second communication module 140.

The first connection module 110 is configured to establish a Bluetooth connection between a first device and a second device.

The first communication module 120 is configured to send a first data packet to the second device and receive a second data packet sent by the second device based on a Bluetooth connection between the first device and the second device, in which both the first data packet and the second data packet are used for a wireless communication between the first device and the second device.

The second connection module 130 is configured to establish a wireless connection between the first device and the second device, in which the establishing of the wireless connection does not comprise an interaction process of handshake messages.

The second communication module 140 is configured to perform the wireless communication between the first device and the second device based on the first data packet and the second data packet.

In an embodiment of the present disclosure, the second communication module 140 is further configured to: generate a first secret key based on the first data packet and the second data packet; and perform the wireless communication between the first device and the second device based on the first secret key.

In an embodiment of the present disclosure, the first secret key is used for a unicast communication between the first device and the second device.

In an embodiment of the present disclosure, the second data packet carries first messages integrity check (MIC) data and first raw data, the first MIC data is obtained based on a second secret key locally in the second device and the first raw data.

Before establishing the wireless connection between the first device and the second device, the first communication module 120 is further configured to: obtain second MIC data based on the first secret key and the first raw data; and perform a message integrity check on the second data packet and perform a consistency check on the first secret key and the second secret key based on the first MIC data and the second MIC data.

In an embodiment of the present disclosure, before establishing the wireless connection between the first device and the second device, the first communication module 120 is further configured to: obtain third MIC data based on the first secret key and second raw data; add the third MIC data and the second raw data to a third data packet, in which the third MIC data is used for performing a message integrity check on the third data packet and performing a consistency check on the first secret key and a second secret key locally in the second device; and send the third data packet to the second device based on the Bluetooth connection between the first device and the second device.

In an embodiment of the present disclosure, the second raw data includes a third secret key, and the third secret key is used for a groupcast communication and/or a broadcast communication between the first device and a plurality of second devices.

In an embodiment of the present disclosure, before establishing the wireless connection between the first device and the second device, the first communication module 120 is further configured to: receive a fourth data packet sent by the second device based on the Bluetooth connection between the first device and the second device, in which the fourth data packet carries third raw data and fourth MIC data, the third raw data includes first indication information, the first indication information is configured to instruct the first device to establish the wireless connection between the first device and the second device, the fourth MIC data is obtained based on a second secret key locally in the second device and the third raw data; obtain fifth MIC data based on the first secret key and the third raw data; and perform a message integrity check on the fourth data packet based on the fourth MIC data and the fifth MIC data.

In an embodiment of the present disclosure, before sending the first data packet to the second device, the first communication module 120 is further configured to: obtain an internet protocol (IP) address assigned to the second device; and add the IP address of the second device to the first data packet.

In an embodiment of the present disclosure, the second data packet carries a media access control (MAC) address of the second device; the second communication module 140 is further configured to: configure an address resolution protocol (ARP) table of the first device based on an IP address of the first device and a MAC address of the first device; configure the address resolution protocol (ARP) table of the first device based on the IP address of the second device and the MAC address of the second device; and perform the wireless communication between the first device and the second device based on the ARP table of the first device.

In an embodiment of the present disclosure, the first data packet further carries an IP address of the first device and a MAC address of the first device.

In an embodiment of the present disclosure, the second connection module 130 is further configured to: create a wireless access point, or create a group and set the first device as an owner of the group; receive an authentication request message sent by the second device; send an authentication response message to the second device; receive an association request message sent by the second device; and send an association response message to the second device.

Regarding the apparatus in the above embodiments, the specific ways in which each module performs operations have been described in detail in the relevant method embodiments, which will not be elaborated here.

With the wireless communication apparatus provided in the embodiments of the disclosure, a Bluetooth connection between a first device and a second device is established. A first data packet is sent to the second device and a second data packet sent by the second device is received based on a Bluetooth connection between the first device and the second device. Both the first data packet and the second data packet are used for a wireless communication between the first device and the second device. A wireless connection between the first device and the second device is established. The establishing of the wireless connection does not include an interaction process of handshake messages. The wireless communication between the first device and the second device is performed based on the first data packet and the second data packet. In this way, transmission of the first data packet and the second data packet can be performed through the Bluetooth connection between two devices. That is, two data packets can be shared between the two devices through the Bluetooth connection, so that the interaction process of handshake messages can be omitted during the establishing of the wireless connection, thereby facilitating reducing the number of message interactions and shortening consumption time of the message interactions, and thus shortening the time of the establishing of the wireless connection and improving the efficiency of the establishing of the wireless connection.

Figure 13:
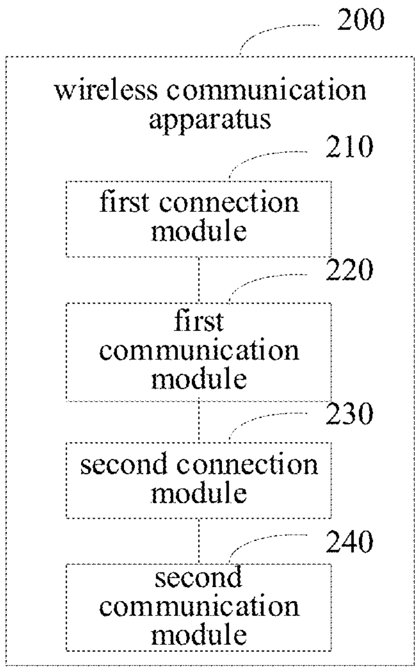
FIG. 13 illustrates a block diagram of a wireless communication apparatus according to an embodiment.

FIG. 13 illustrates a block diagram of a wireless communication apparatus according to another embodiment. As shown in FIG. 13, the wireless communication apparatus 200 of the embodiment of the disclosure includes a first connection module 210, a first communication module 220, a second connection module 230, and a second communication module 240.

The first connection module 210 is configured to establish a Bluetooth connection between a first device and a second device.

The first communication module 220 is configured to receive a first data packet sent by the first device and send a second data packet to the first device based on a Bluetooth connection between the first device and the second device, in which both the first data packet and the second data packet are used for a wireless communication between the first device and the second device.

The second connection module 230 is configured to establish a wireless connection between the first device and the second device, in which the establishing of the wireless connection does not comprise an interaction process of handshake messages.

The second communication module 240 is configured to perform the wireless communication between the first device and the second device based on the first data packet and the second data packet.

In an embodiment of the present disclosure, the second communication module 240 is further configured to: generate a second secret key based on the first data packet and the second data packet; and perform the wireless communication between the first device and the second device based on the second secret key.

In an embodiment of the present disclosure, the second secret key is used for a unicast communication between the first device and the second device.

In an embodiment of the present disclosure, before sending the second data packet to the first device, the first communication module 220 is further configured to: obtain first messages integrity check (MIC) data based on the second secret key and first raw data in the second data packet; and add the first MIC data to the second data packet, in which the first MIC data is used for performing a message integrity check on the second data packet and performing a consistency check on a first secret key locally in the first device and the second secret key.

In an embodiment of the present disclosure, before establishing the wireless connection between the first device and the second device, the first communication module 220 is further configured to: receive a third data packet sent by the first device based on the Bluetooth connection between the first device and the second device, in which the third data packet carries second raw data and third MIC data, the third MIC data is obtained based on a first secret key locally in the first device and the second raw data; obtain sixth MIC data based on the second secret key and the second raw data; perform a message integrity check on the third data packet and perform a consistency check on the first secret key and the second secret key based on the third MIC data and the sixth MIC data.

In an embodiment of the present disclosure, the second raw data includes a third secret key, and the third secret key is used for a groupcast communication and/or a broadcast communication between the first device and a plurality of second devices.

In an embodiment of the present disclosure, before establishing the wireless connection between the first device and the second device, the first communication module 220 is further configured to: obtain fourth MIC data based on the second secret key and third raw data, in which the third raw data includes first indication information, the first indication information is configured to instruct the first device to establish the wireless connection between the first device and the second device; add the fourth MIC data and the third raw data to a fourth data packet, in which the fourth MIC data is used for performing a message integrity check on the fourth data packet; and send the fourth data packet to the first device based on the Bluetooth connection between the first device and the second device.

In an embodiment of the present disclosure, the first data packet includes an internet protocol (IP) address assigned to the second device.

In an embodiment of the present disclosure, the second data packet carries a media access control (MAC) address of the second device.

In an embodiment of the present disclosure, the first data packet further carries an IP address of the first device and a MAC address of the first device.

The second communication module 240 is further configured to: configure an address resolution protocol (ARP) table of the second device based on the IP address of the first device and the MAC address of the first device; configure the address resolution protocol (ARP) table of the second device based on the IP address of the second device and the MAC address of the second device; and perform the wireless communication between the first device and the second device based on the ARP table of the second device.

In an embodiment of the present disclosure, the second device is a client of a wireless access point created by the first device, or the second device is a client of a group created by the first device.

The second connection module 230 is configured to: send an authentication request message to the first device; receive an authentication response message sent by the first device; send an association request message to the first device; and receive an association response message sent by the first device.

Regarding the apparatus in the above embodiments, the specific ways in which each module performs operations have been described in detail in the relevant method embodiments, which will not be elaborated here.

With the wireless communication apparatus provided in the embodiments of the disclosure, a Bluetooth connection between a first device and a second device is established. A first data packet sent by the first device is received and a second data packet is sent to the first device based on a Bluetooth connection between the first device and the second device. Both the first data packet and the second data packet are used for a wireless communication between the first device and the second device. A wireless connection between the first device and the second device is established. The establishing of the wireless connection does not include an interaction process of handshake messages. The wireless communication between the first device and the second device is performed based on the first data packet and the second data packet. In this way, transmission of the first data packet and the second data packet can be performed through the Bluetooth connection between two devices. That is, two data packets can be shared between the two devices through the Bluetooth connection, so that the interaction process of handshake messages can be omitted during the establishing of the wireless connection, thereby facilitating reducing the number of message interactions and shortening consumption time of the message interactions, and thus shortening the time of the establishing of the wireless connection and improving the efficiency of the establishing of the wireless connection.

Figure 14:
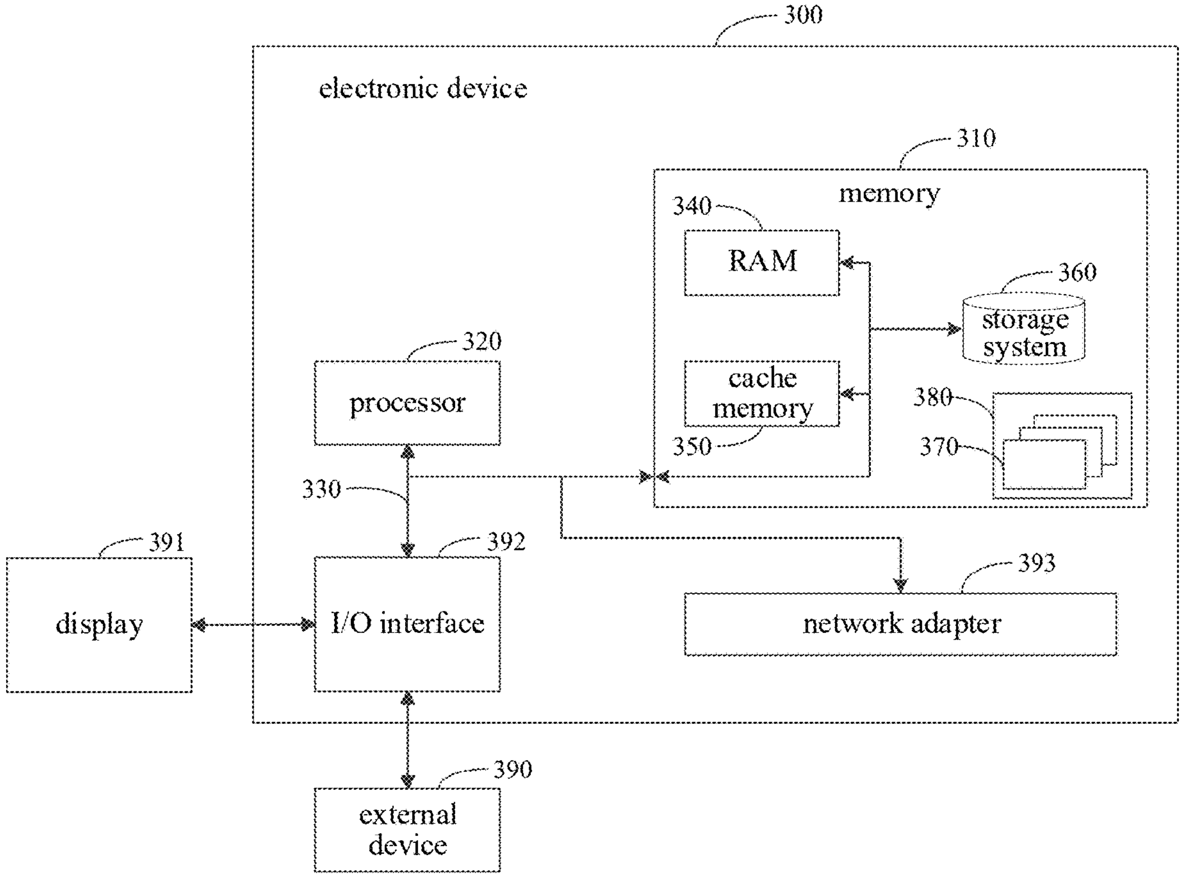
FIG. 14 illustrates a block diagram of an electronic device according to an embodiment.

FIG. 14 illustrates a block diagram of an electronic device according to an embodiment.

As shown in FIG. 14, the electronic device 300 includes: a memory 310, a processor 320, and a bus 330 connected different components (including the memory 310 and the processor 320). The memory has computer programs stored thereon, when the processor 320 executes the computer programs, the wireless communication method of the embodiments of the disclosure is implemented.

The bus 330 represents one or more of several types of bus structures, including a memory bus or a memory controller, a peripheral bus, a local bus of a graphics acceleration port, a processor, or any bus structure of multiple bus structures. For example, these architectures include but are not limited to an industrial standard architecture (ISA) bus, a microchannel architecture (MAC) bus, an enhanced ISA bus, a video electronics standards association (VESA) local bus, and a peripheral component interconnect (PCI) bus.

The electronic device 300 typically includes various electronic device readable media. These media can be any available media that can be accessed by the electronic device 300, including volatile and non-volatile media, removable and non-removable media.

The memory 310 may also include a computer system readable medium in the form of volatile memory, such as random access memory (RAM) 340 and/or a cache memory 350. The electronic device 300 may further include other removable/non-removable, volatile/non-volatile computer system storage media. For example, the storage system 360 can be used to read and write non-removable, non-volatile magnetic media (not shown in FIG. 14, commonly referred to as "hard disk drive"). Although not shown in FIG. 14, a disk driver for reading and writing a removable non-volatile disk (such as "floppy disks") and an optical disk driver for reading and writing a removable non-volatile optical disk (such as CD ROM, DVD ROM, or other optical media) can be provided. In these cases, each driver can be connected to the bus 330 through one or more data media interfaces. The memory 310 may include at least one program product having a set of (e.g., at least one) program modules configured to perform the functions of the embodiments disclosed herein.

A program/utility 380 having a set of (at least one) program modules 370 may be stored in, for example, the memory 310. Such program modules 370 include, but are not limited to, an operating system, one or more application programs, other program modules, and program data, each or some combination of which may include an implementation of a network environment. The program module 370 typically performs the functions and/or methods described in the embodiments disclosed herein.

The electronic device 300 can also communicate with one or more external devices 390 (such as keyboard, pointing device, display 391, etc.), as well as with one or more devices that enable users to interact with the electronic device 300, and/or with any device that enables the electronic device 300 to communicate with one or more other computing devices (such as network card, modem, etc.). This communication can be performed through an input/output (I/O) interface 392. Moreover, the electronic device 300 can also communicate with one or more networks (such as local area network (LAN), wide area network (WAN), and/or public network, such as the Internet) through a network adapter 393. As shown in FIG. 14, the network adapter 393 communicates with other modules of the electronic device 300 through the bus 330. It should be understood that although not shown in the figure, other hardware and/or software modules can be used in conjunction with the electronic device 300, including but not limited to microcode, device drivers, redundant processing units, external disk driver arrays, RAID systems, tape drivers, and data backup storage systems.

The processor 320 performs various functions and data processing by executing the programs stored in the memory 310.

It should be noted that regarding an implementation and a principle of the electronic device, reference can be made to the description of the wireless communication method in the above embodiments of the disclosure, which will be not elaborated here.

The electronic device provided in the embodiment of the disclosure may perform the wireless communication method described above. A Bluetooth connection between a first device and a second device is established. A first data packet is sent to the second device and a second data packet sent by the second device is received based on a Bluetooth connection between the first device and the second device. Both the first data packet and the second data packet are used for a wireless communication between the first device and the second device. A wireless connection between the first device and the second device is established. The establishing of the wireless connection does not include an interaction process of handshake messages. The wireless communication between the first device and the second device is performed based on the first data packet and the second data packet. In this way, transmission of the first data packet and the second data packet can be performed through the Bluetooth connection between two devices. That is, two data packets can be shared between the two devices through the Bluetooth connection, so that the interaction process of handshake messages can be omitted during the establishing of the wireless connection, thereby facilitating reducing the number of message interactions and shortening consumption time of the message interactions, and thus shortening the time of the establishing of the wireless connection and improving the efficiency of the establishing of the wireless connection.

In order to implement the above embodiments, the present disclosure also proposes a computer-readable storage medium having computer program instructions stored thereon. When the computer program instructions are executed by a processor, the steps of the wireless communication method provided in the present disclosure are implemented.

Optionally, the computer-readable storage medium can include a ROM, a random access memory (RAM), a CD-ROM, a magnetic tape, a floppy disk, and an optical data storage device, and so on.

In order to implement the above embodiments, the present disclosure also proposes a computer program product including computer programs. When the computer programs are executed by a processor of an electronic device, the steps of the wireless communication method provided in the present disclosure are implemented.

Other embodiments of the disclosure will be apparent to those skilled in the art from consideration of the specification and practice of the disclosure disclosed here. This disclosure is intended to cover any variations, uses, or adaptive changes of this disclosure that follow the general principle of the disclosure and include common knowledge or common technical means in the art that are not disclosed in the disclosure. The specification and embodiments are only considered illustrative, and a true scope and spirit of the disclosure are specified by the following claims.

It should be understood that the disclosure is not limited to the exact construction described above and shown in the accompanying drawings, and various modifications and changes can be made without departing from the scope thereof. It is intended that the scope of the disclosure only be limited by the appended claims.

What is claimed is:

1. A wireless communication method, comprising:

establishing a Bluetooth connection between a first device and a second device;

sending a first data packet to the second device and receiving a second data packet sent by the second device based on the Bluetooth connection between the first device and the second device, wherein both the first data packet and the second data packet are used for a wireless communication between the first device and the second device;

establishing a wireless connection between the first device and the second device, wherein the establishing of the wireless connection does not comprise an interaction process of handshake messages; and performing the wireless communication between the first device and the second device based on the first data packet and the second data packet;

wherein performing the wireless communication between the first device and the second device based on the first data packet and the second data packet comprises:

generating a first secret key based on the first data packet and the second data packet; and performing the wireless communication between the first device and the second device based on the first secret key.

2. The method of claim 1, wherein the first secret key is used for a unicast communication between the first device and the second device.

3. The method of claim 1, wherein the second data packet carries first message integrity check (MIC) data and first raw data, the first MIC data is obtained based on a second secret key locally in the second device and the first raw data;

wherein before establishing the wireless connection between the first device and the second device, the method further comprises:

obtaining second MIC data based on the first secret key and the first raw data; and performing a message integrity check on the second data packet and performing a consistency check on the first secret key and the second secret key based on the first MIC data and the second MIC data.

4. The method of claim 1, wherein before establishing the wireless connection between the first device and the second device, the method further comprises:

obtaining third MIC data based on the first secret key and second raw data;

adding the third MIC data and the second raw data to a third data packet, wherein the third MIC data is used for performing a message integrity check on the third data packet and performing a consistency check on the first secret key and a second secret key locally in the second device; and sending the third data packet to the second device based on the Bluetooth connection between the first device and the second device.

5. The method of claim 4, wherein the second raw data comprises a third secret key, and the third secret key is used for at least one of a groupcast communication or a broadcast communication between the first device and a plurality of second devices.

6. The method of claim 1, wherein before establishing the wireless connection between the first device and the second device, the method further comprises:

receiving a fourth data packet sent by the second device based on the Bluetooth connection between the first device and the second device, wherein the fourth data packet carries third raw data and fourth MIC data, the third raw data comprises first indication information, the first indication information is configured to instruct the first device to establish the wireless connection between the first device and the second device, the fourth MIC data is obtained based on a second secret key locally in the second device and the third raw data;

obtaining fifth MIC data based on the first secret key and the third raw data; and performing a message integrity check on the fourth data packet based on the fourth MIC data and the fifth MIC data.

7. The method of claim 1, wherein before sending the first data packet to the second device, the method further comprises:

obtaining an internet protocol (IP) address assigned to the second device; and adding the IP address of the second device to the first data packet.

8. The method of claim 7, wherein the second data packet carries a media access control (MAC) address of the second device;

performing the wireless communication between the first device and the second device based on the first data packet and the second data packet comprises:

configuring an address resolution protocol (ARP) table of the first device to obtain a first ARP table, based on an IP address of the first device and a MAC address of the first device;

configuring the first ARP table to obtain a second ARP table, based on the IP address of the second device and the MAC address of the second device; and performing the wireless communication between the first device and the second device based on the second ARP table.

9. The method of claim 1, wherein establishing the wireless connection between the first device and the second device comprises:

creating a wireless access point, or creating a group and setting the first device as an owner of the group;

receiving an authentication request message sent by the second device;

sending an authentication response message to the second device;

receiving an association request message sent by the second device; and sending an association response message to the second device.

10. A wireless communication method, comprising:

establishing a Bluetooth connection between a first device and a second device;

receiving a first data packet sent by the first device and sending a second data packet to the first device based on a Bluetooth connection between the first device and the second device, wherein both the first data packet and the second data packet are used for a wireless communication between the first device and the second device;

establishing a wireless connection between the first device and the second device, wherein the establishing of the wireless connection does not comprise an interaction process of handshake messages; and performing the wireless communication between the first device and the second device based on the first data packet and the second data packet;

wherein performing the wireless communication between the first device and the second device based on the first data packet and the second data packet comprises:

generating a second secret key based on the first data packet and the second data packet; and performing the wireless communication between the first device and the second device based on the second secret key.

11. The method of claim 10, wherein the second secret key is used for a unicast communication between the first device and the second device.

12. The method of claim 10, wherein before sending the second data packet to the first device, the method further comprises:

obtaining first messages integrity check (MIC) data based on the second secret key and first raw data in the second data packet; and adding the first MIC data to the second data packet, wherein the first MIC data is used for performing a message integrity check on the second data packet and performing a consistency check on a first secret key locally in the first device and the second secret key.

13. The method of claim 10, wherein before establishing the wireless connection between the first device and the second device, the method further comprises:

receiving a third data packet sent by the first device based on the Bluetooth connection between the first device and the second device, wherein the third data packet carries second raw data and third MIC data, the third MIC data is obtained based on a first secret key locally in the first device and the second raw data;

obtaining sixth MIC data based on the second secret key and the second raw data;

performing a message integrity check on the third data packet and performing a consistency check on the first secret key and the second secret key based on the third MIC data and the sixth MIC data.

14. The method of claim 13, wherein the second raw data comprises a third secret key, and the third secret key is used for at least one of a groupcast communication or a broadcast communication between the first device and a plurality of second devices.

15. The method of claim 10, wherein before establishing the wireless connection between the first device and the second device, the method further comprises:

obtaining fourth MIC data based on the second secret key and third raw data, wherein the third raw data comprises first indication information, the first indication information is configured to instruct the first device to establish the wireless connection between the first device and the second device;

adding the fourth MIC data and the third raw data to a fourth data packet, wherein the fourth MIC data is used for performing a message integrity check on the fourth data packet; and sending the fourth data packet to the first device based on the Bluetooth connection between the first device and the second device.

16. The method of claim 10, wherein the first data packet comprises an internet protocol (IP) address assigned to the second device.

17. The method of claim 16, wherein the first data packet further carries an IP address of the first device and a MAC address of the first device;

performing the wireless communication between the first device and the second device based on the first data packet and the second data packet comprises:

configuring an address resolution protocol (ARP) table of the second device based on the IP address of the first device and the MAC address of the first device;

configuring the address resolution protocol (ARP) table of the second device based on the IP address of the second device and the MAC address of the second device; and performing the wireless communication between the first device and the second device based on the ARP table of the second device.

18. An electronic device, comprising:

a processor;

a memory for storing instructions executable by the processor;

wherein the processor is configured to perform:

establishing a Bluetooth connection between a first device and a second device;

sending a first data packet to the second device and receiving a second data packet sent by the second device based on the Bluetooth connection between the first device and the second device, wherein both the first data packet and the second data packet are used for a wireless communication between the first device and the second device;

establishing a wireless connection between the first device and the second device, wherein the establishing of the wireless connection does not comprise an interaction process of handshake messages; and performing the wireless communication between the first device and the second device based on the first data packet and the second data packet;

wherein performing the wireless communication between the first device and the second device based on the first data packet and the second data packet comprises:

generating a second secret key based on the first data packet and the second data packet; and performing the wireless communication between the first device and the second device based on the second secret key.

* * * * *